(12) United States Patent
Sheesley

(10) Patent No.: US 9,309,064 B2
(45) Date of Patent: Apr. 12, 2016

(54) BELLY-DUMP INTERMODAL CARGO CONTAINER

(71) Applicant: John M. Sheesley, San Antonio, TX (US)

(72) Inventor: John M. Sheesley, San Antonio, TX (US)

(*) Notice: Subject to any disclaimer, the term of this patent is extended or adjusted under 35 U.S.C. 154(b) by 0 days.

(21) Appl. No.: 14/749,591

(22) Filed: Jun. 24, 2015

(65) Prior Publication Data

US 2015/0368052 A1 Dec. 24, 2015

Related U.S. Application Data

(60) Provisional application No. 62/016,210, filed on Jun. 24, 2014.

(51) Int. Cl.
| | | |
|---|---|---|
| *B65G 1/00* | (2006.01) | |
| *B65G 65/40* | (2006.01) | |
| *B65D 88/30* | (2006.01) | |
| *B65D 88/12* | (2006.01) | |
| *B65D 90/62* | (2006.01) | |

(52) U.S. Cl.
CPC .............. *B65G 65/40* (2013.01); *B65D 88/129* (2013.01); *B65D 88/30* (2013.01); *B65D 90/623* (2013.01); *B65D 2590/0091* (2013.01)

(58) Field of Classification Search
CPC ........ B65G 65/40; B65D 88/12; B65D 88/30; B65D 88/58; B65D 90/587; B65D 2590/664; B60P 1/56; B61D 7/30
USPC ........................... 294/68.3, 905; 414/411, 332
See application file for complete search history.

(56) References Cited

U.S. PATENT DOCUMENTS

| | | | |
|---|---|---|---|
| 2,237,299 A * | 4/1941 | Benbow | B60P 1/56 |
| | | | 105/240 |
| 2,856,222 A * | 10/1958 | Gossett | B65D 90/582 |
| | | | 294/68.24 |
| 4,819,830 A | 4/1989 | Schultz | |
| 4,944,421 A | 7/1990 | Yurgevich | |
| 4,995,522 A | 2/1991 | Barr | |
| 5,190,182 A | 3/1993 | Copas et al. | |
| 6,012,598 A | 1/2000 | Antoniou | |
| 6,024,232 A * | 2/2000 | Helgesson | B66C 13/54 |
| | | | 180/89.13 |
| 6,105,805 A | 8/2000 | Labelle et al. | |
| 6,401,983 B1 | 6/2002 | McDonald et al. | |
| 7,104,425 B2 | 9/2006 | Le Roy | |
| 7,377,219 B2 * | 5/2008 | Brandt | B61D 7/30 |
| | | | 104/162 |
| D688,349 S | 8/2013 | Oren et al. | |
| D688,350 S | 8/2013 | Oren et al. | |
| D688,351 S | 8/2013 | Oren et al. | |

(Continued)

*Primary Examiner* — Saul Rodriguez
*Assistant Examiner* — Mark Hageman
(74) *Attorney, Agent, or Firm* — Gunn, Lee & Cave, P.C.

(57) ABSTRACT

A container comprising a frame conforming to ISO intermodal container dimensions, a hopper attached within the frame; the hopper defining a chute having a first opening and a second opening, at least one door pivotally attached to the hopper proximal to the second opening; at least one gate assembly attached to the at least one door; a connector apparatus panel mounted to the frame; and at least one actuating fluid or electrical line connected between the at least one gate and the connector apparatus panel. An alternative embodiment includes at least one air tank connected to the container and filled through an air transfer system and a plunger system to cause actuation of container doors for releasing of materials into a second receptacle and where the air transfer and plunger systems reside partially on a rough terrain container handler vehicle.

15 Claims, 25 Drawing Sheets

(56) References Cited

U.S. PATENT DOCUMENTS

| | | |
|---|---|---|
| D688,597 S | 8/2013 | Oren |
| D688,772 S | 8/2013 | Oren et al. |
| 8,505,780 B2 | 8/2013 | Oren |
| 8,545,148 B2 | 10/2013 | Wanet-Pusset et al. |
| 8,585,341 B1 | 11/2013 | Oren et al. |
| D694,670 S | 12/2013 | Oren |
| 8,622,251 B2 | 1/2014 | Oren |
| 8,668,430 B2 | 3/2014 | Oren et al. |
| D703,582 S | 4/2014 | Oren |
| 8,827,118 B2 | 9/2014 | Oren |
| 9,052,034 B1 * | 6/2015 | Wegner ................ B65D 90/587 |
| 2008/0226434 A1 | 9/2008 | Smith |
| 2009/0078410 A1 | 3/2009 | Krenek et al. |
| 2012/0139274 A1 * | 6/2012 | Fleischer ................ B66C 1/101 294/67.3 |
| 2013/0161211 A1 | 6/2013 | Oren |
| 2013/0291760 A1 * | 11/2013 | Wellman .................. B61D 7/02 105/286 |
| 2014/0020765 A1 | 1/2014 | Oren |
| 2014/0023463 A1 | 1/2014 | Oren |
| 2014/0023464 A1 | 1/2014 | Oren |
| 2014/0023465 A1 | 1/2014 | Oren |
| 2014/0246341 A1 | 9/2014 | Oren |
| 2014/0299225 A1 | 10/2014 | Oren |
| 2014/0299226 A1 | 10/2014 | Oren et al. |
| 2014/0308109 A1 | 10/2014 | Oren |
| 2015/0003943 A1 | 1/2015 | Oren et al. |
| 2015/0003955 A1 | 1/2015 | Oren et al. |

* cited by examiner

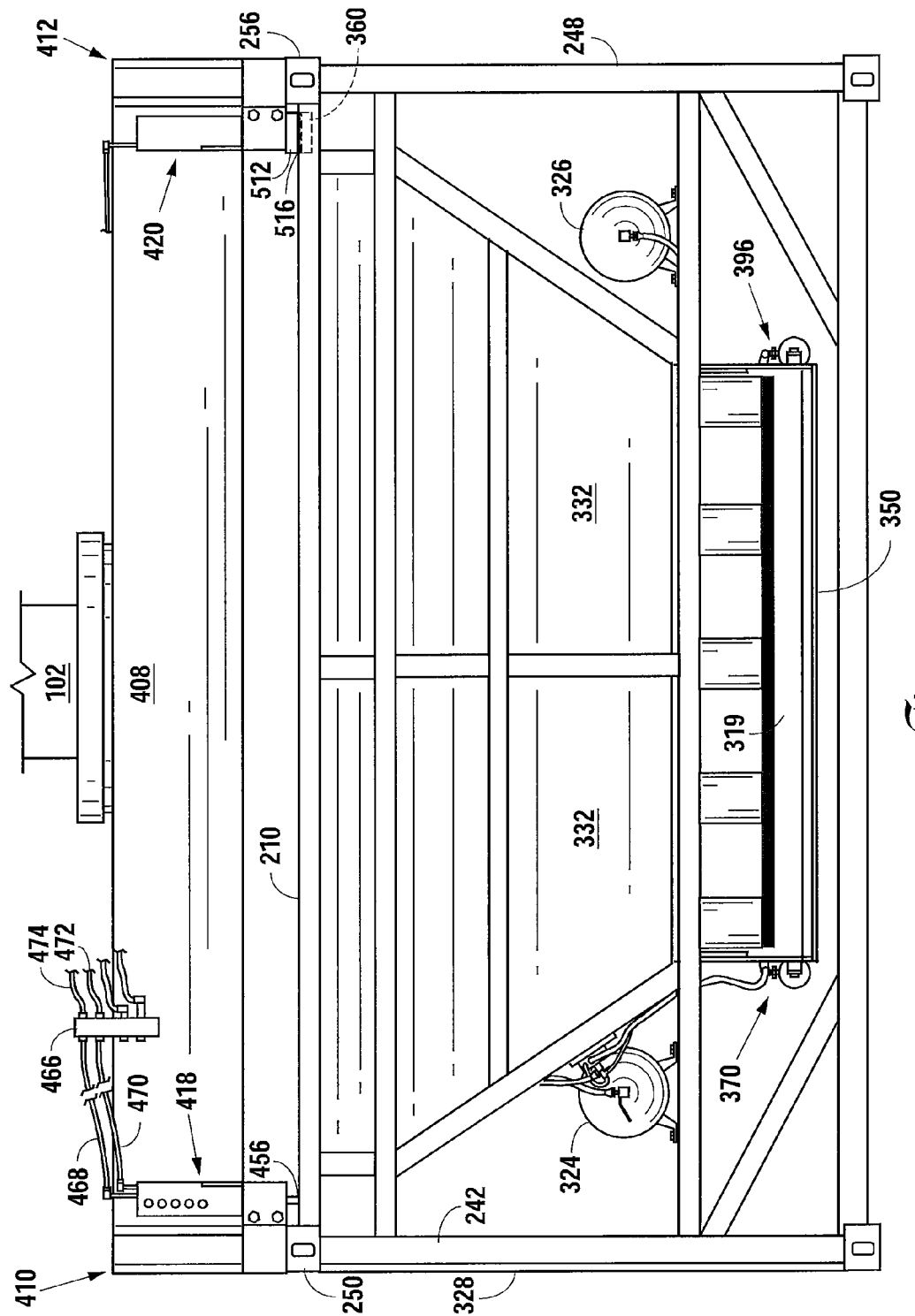

BELLY-DUMP INTERMODAL CARGO CONTAINER

CROSS-REFERENCES TO RELATED APPLICATIONS

This original non-provisional patent application claims priority to and the benefit of U.S. provisional application Ser. No. 62/016,210, filed Jun. 24, 2014, and entitled "Belly-Dump Intermodal Cargo Container," which is incorporated by reference herein.

The following applications are also incorporated by reference: U.S. application Ser. No. 13/370,401, filed Feb. 10, 2012; U.S. application Ser. No. 13/661,198, filed Oct. 26, 2012; U.S. application Ser. No. 13/188,226, filed Feb. 24, 2014; and U.S. application Ser. No. 13/648,939, filed Oct. 10, 2012.

STATEMENT REGARDING FEDERALLY-SPONSORED RESEARCH OR DEVELOPMENT

Not applicable.

BACKGROUND

1. Field of the Invention

The present invention relates to bulk material handling. More specifically, the invention relates to the transportation, storage and dispensing of a multitude of dry bulk products such as gravel, sand, and mine minerals.

2. Description of the Related Art

Demurrage refers to the charges paid to a transporter for extra use of the transporting equipment as a result of wait time. Demurrage is one of the primary cost drivers in shipping material from a source (e.g., a quarry, construction site, industrial site, or agricultural site), and may apply at either end of the haul.

For example, a typical source may operate for a limited time (e.g., twelve hours) each day. In the event a particularly large order of material is to be hauled from the source on a given day, trucks may be lined up waiting to be loaded with material because the source cannot operate fast enough to eliminate wait time. This results in less product movement for the source and additional demurrage charges to the customer for the trucks that are filled later in the queue. In addition, the current practice in loading trucks may also include the trucks entering into the quarry to be loaded. In doing so, the trucks get really messy—the degree to which may depend on the weather—and end up removing dirt and mud from the quarry and tracking same all over the roads requiring substantial clean-up costs.

The same bottleneck may occur with material delivery. If a large number of trucks arrive within a short time period at the delivery site for the material, the trucks that arrived last may be forced to wait while the earlier trucks unload their material first. Typically, these trucks are of the belly-dump or end-dump variety, which have relatively lengthy unloading times. Thus, the receiving party may incur demurrage charges associated with the later arriving trucks because of the amount of time it takes for the earlier arrived trucks to dump their load.

Take, for example, gravel or base material to be used for a highway foundation. This means contractors from around the country use material from a limited number of quarries, resulting in large numbers of trucks arriving at the quarries to accept loads for delivery throughout the United States. If the quarries cannot load the material quickly enough into the waiting trucks, someone—maybe the quarry, maybe the customer—incurs demurrage charges.

Similarly, if a truck delivers bulk materials to the construction site but cannot unload immediately on arrival, the contractor is charged demurrage for waiting. In fact, it is not uncommon at a construction site for a number of trucks to be waiting in line to be unloaded, for which the contractor is being charged for demurrage. It is important that as soon as the bulk materials are delivered to the construction site, they can be immediately unloaded to minimize demurrage charges.

BRIEF SUMMARY OF THE INVENTION

The present invention provides a container and a system for handling bulk material at a source or destination. Specifically, the container provides for more efficient loading and unloading of material to, among other things, minimize wait times and resultant demurrage charges.

The present invention improves on the art in at least two ways. First, the present invention allows containers to be preloaded with materials during the night shift of a quarry. If a quarry knows of a large number of trucks to be loaded the following day, the prior night shift may be used to load the container. When the trucks arrive for pick-up, the containers may be quickly dispensed into the truck trailers or alternatively suspended over the bed of belly-dump or end-dump trucks and the material caused to flow from the container into the truck bed. This reduces wait time, and therefore demurrage charges, associated with loading, ultimately moving more product.

Second, at delivery, the entire container may be removed from the truck in a shorter time than it takes for the truck to properly position itself and dump its load. This allows the truck to leave the work site more quickly. The containers then may later be positioned in the desired location and emptied. The truck can also be offloaded roadside which would avoid tracking debris onsite.

In one embodiment, the present invention comprises a frame conforming to an ISO standard for an intermodal cargo container; a hopper attached within the frame, the hopper defining a chute having a first opening and a second opening; at least one door pivotally attached to the hopper bottom proximal to the second opening; at least one gate assembly attached to the at least one door; a connector apparatus panel mounted to the frame; and at least one fluid (e.g., hydraulic or pneumatic) or electrical line connected between the at least one gate and the connector apparatus panel.

In an alternative embodiment, the present invention includes at least one air tank connected to the container such that the air tanks contain sufficient air to actuate the doors of the container for releasing of materials into a second receptacle. The air tanks are connected to each other via fluid lines such through use of an air compressor one air tank may be filled with air then proceed with filling the second air tank. Once the air tanks are full, the air compressor stops. The air compressor can also be stopped manually or remotely at any time desired by the operator.

In another embodiment, the present invention includes a system that includes an air transfer system for providing the required air sufficient to fill air tanks on the container. Once full (or containing sufficient air content and pressure), the air tanks can then be used to actuate the gate assemblies and open the belly dump doors, thus, emptying content, if any, into another receptacle.

In yet another embodiment, the present invention includes a system that includes a plunger system for automatically and/or remotely actuating a lever causing the doors of the container to open for releasing of materials into a second receptacle.

In an alternative embodiment, the present invention comprises a system for handling dry bulk material that includes a container releasably attached to a rough terrain container handler and having a plunger system and an air transfer system.

An advantage of the present invention is the prevention and elimination of the substantial clean-up costs of dirt and mud and other unsightly environmental contaminants from the roads as the trucks can be loaded along the roadside without having to enter into the quarry pit, thereby maintaining a clean vehicle and clean and clear roads An additional advantage is that the present invention further eliminates several pieces of heavy machinery used in the oil industry that may pose health and environmental concerns, including pneumatic trucks (as they unload materials into storage receptacle) and T-belts and further reduces the number of storage receptacles needed to be kept on site. The elimination of this machinery translates into substantial cost savings.

BRIEF DESCRIPTION OF THE FIGURES

FIG. 20 is a side elevation view of an embodiment of the present invention showing a top handler engaged with the container.

DETAILED DESCRIPTION OF CERTAIN EMBODIMENTS

Figure 1:
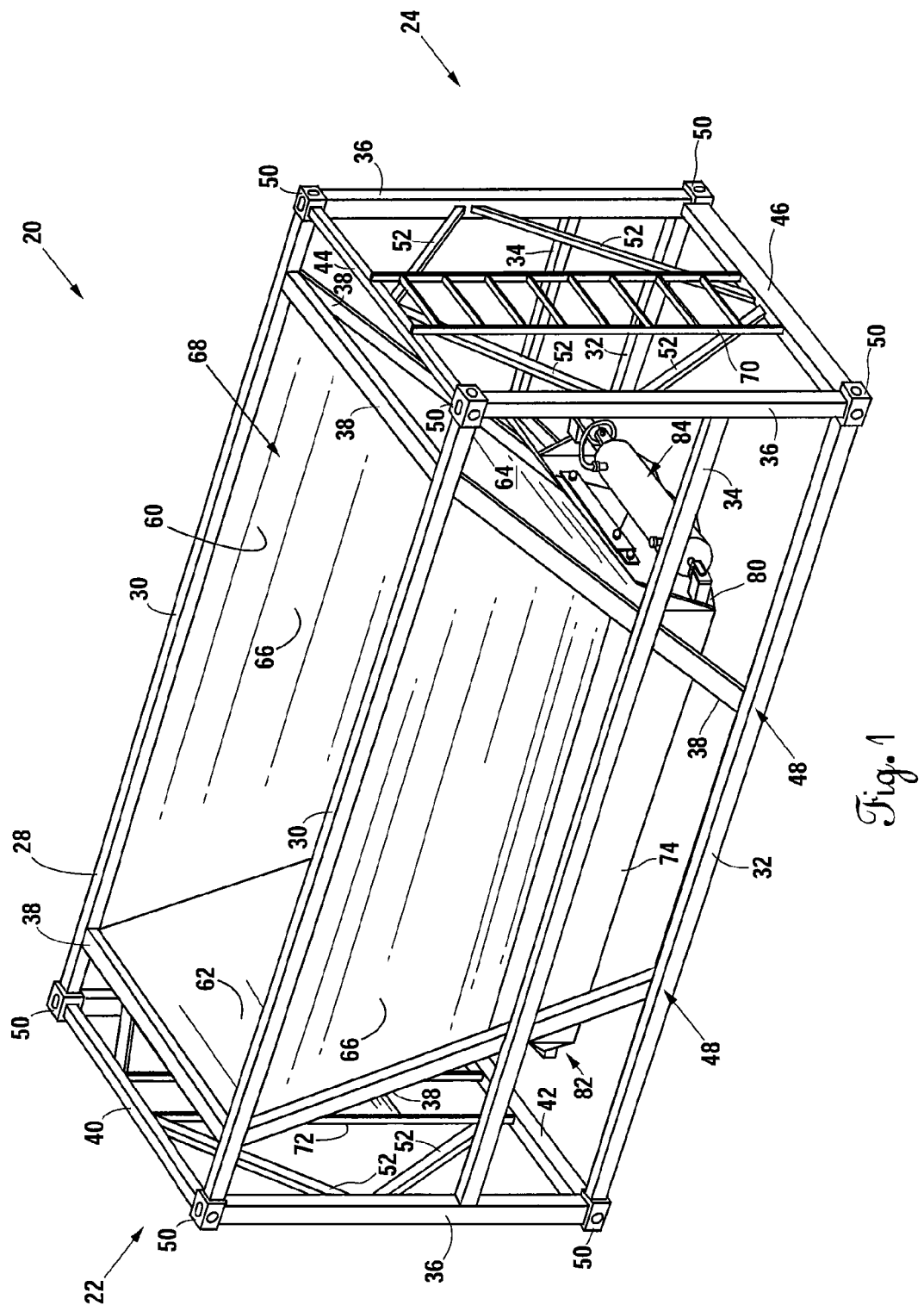
FIG. 1 is a top perspective view of a first embodiment of the present invention.
Figure 2:
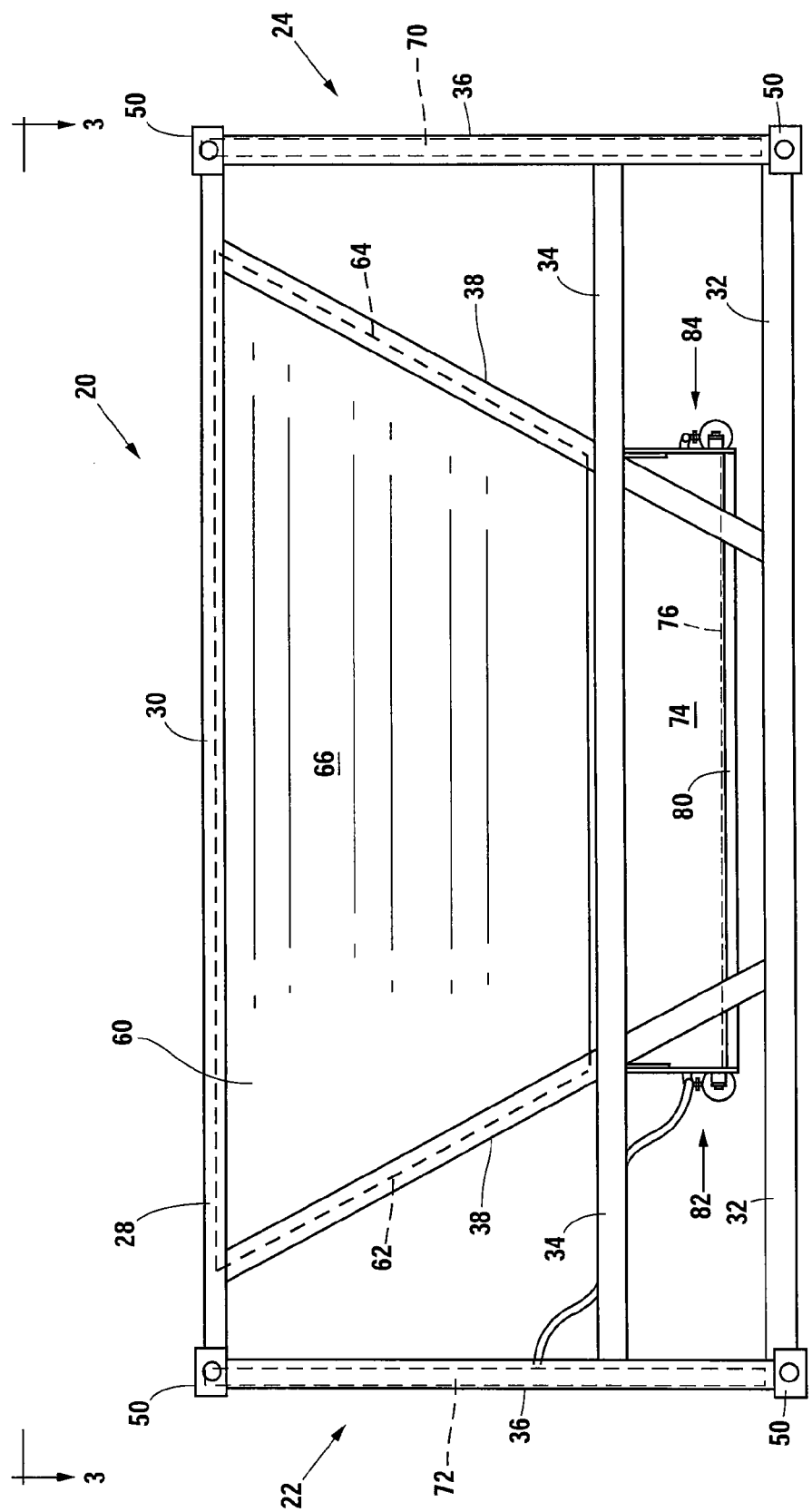
FIG. 2 is a side elevation of the first embodiment.
Figure 3:
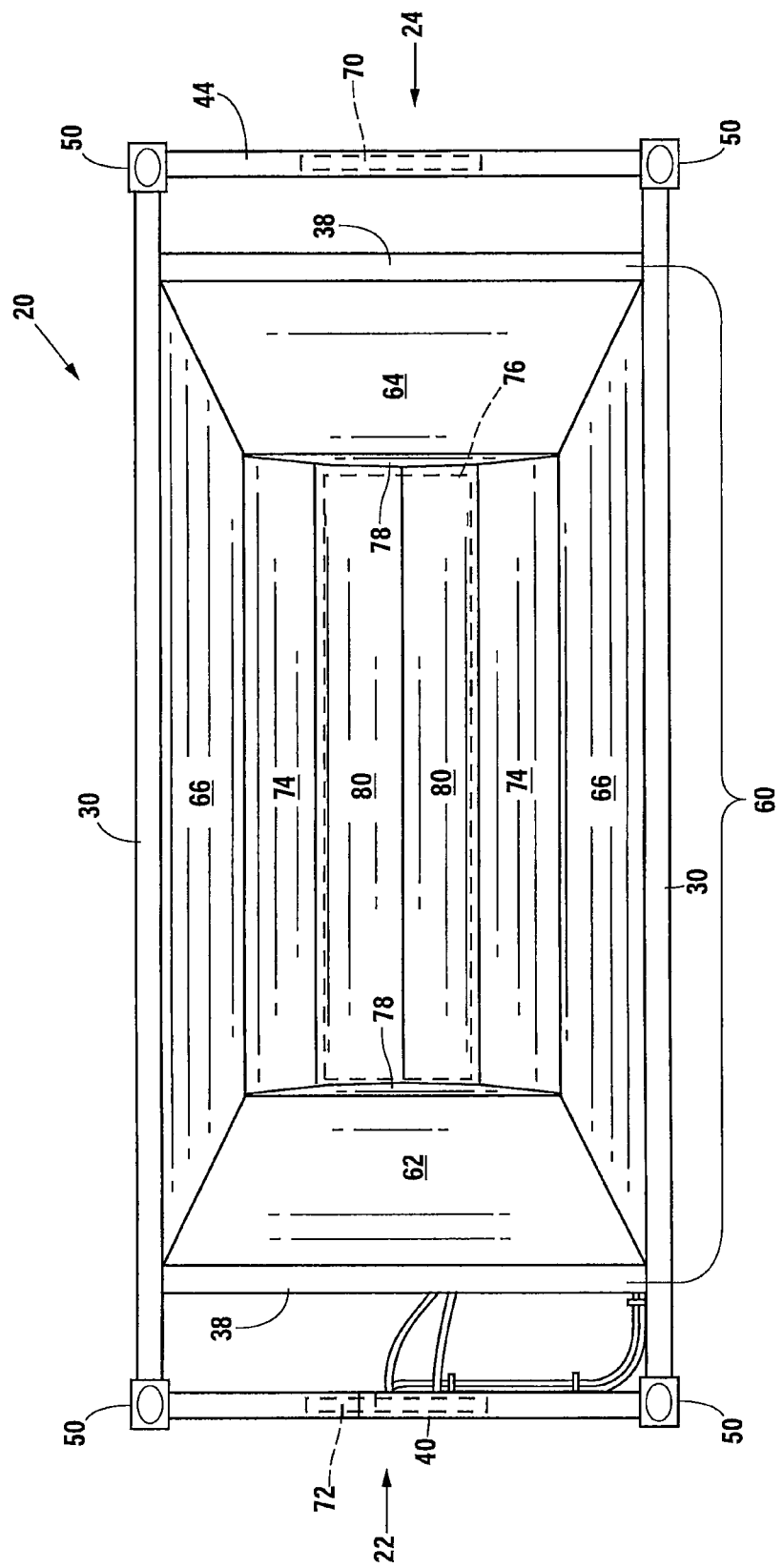
FIG. 3 is a top view of the first embodiment.

Referring to FIGS. 1-3, one embodiment 20 of the present invention includes a front end 22 and a rear end 24. The embodiment 20 is twenty feet long and can be either nine-and-a-half feet (9.5 ft) or eight-and-a-half feet (8.5 ft) tall, and eight feet wide, which are dimensions for ISO standard and high cube intermodal cargo container. The embodiment 20 includes a hopper 60 attached within a frame 28.

The frame 28 includes upper side rails 30, lower side rails 32, intermediate side rails 34, corner posts 36, supports 38, an upper front end rail 40, a lower front end rail 42, an upper rear end rail 44, a lower rear end rail 46. The supports 38 are connected (e.g., welded) to the upper end rails 40, 44 and intermediate positions 48 along the lower side rail 32. The supports 38 are also attached to the intermediate side rails 34. Corner castings 50 are positioned at the corners of the frame 28. The castings 50 comply with international standard ISO 1161:1984. Struts 52 connect the end rails 40, 42, 44, 46 to the corner posts 36.

The hopper 60 is formed from a front plate 62, a rear plate 64, and two side plates 66 joined in a partial inverted-pyramid configuration. The front plate 62, rear plate 64 and side plates 66 are attached to the supports 38. The hopper 60 defines a chute having a first opening 68 (see FIG. 1) and a second opening 76 (see FIGS. 2-3).

A ladder 70 is connected to the upper rear end rail 44 and the lower rear end rail 46. A connection panel 72 is connected between the upper front end rail 40 and the lower front end rail 42.

A pair of rectangular side plates 74 is connected to the hopper side plates 66 and extends downward to form a second opening 76 of the hopper 60. A pair of rectangular end plates 78 is connected to the end plates 62, 64 to form a space defining the second opening 76.

Referring to FIGS. 2-3, the second opening 76 is closed off by two elongate doors 80 pivotally connected to the hopper 60. Each door 80 is also connected to a front gate assembly 82 and an identical rear gate assembly 84 that is mounted to the hopper 60.

Figure 4:
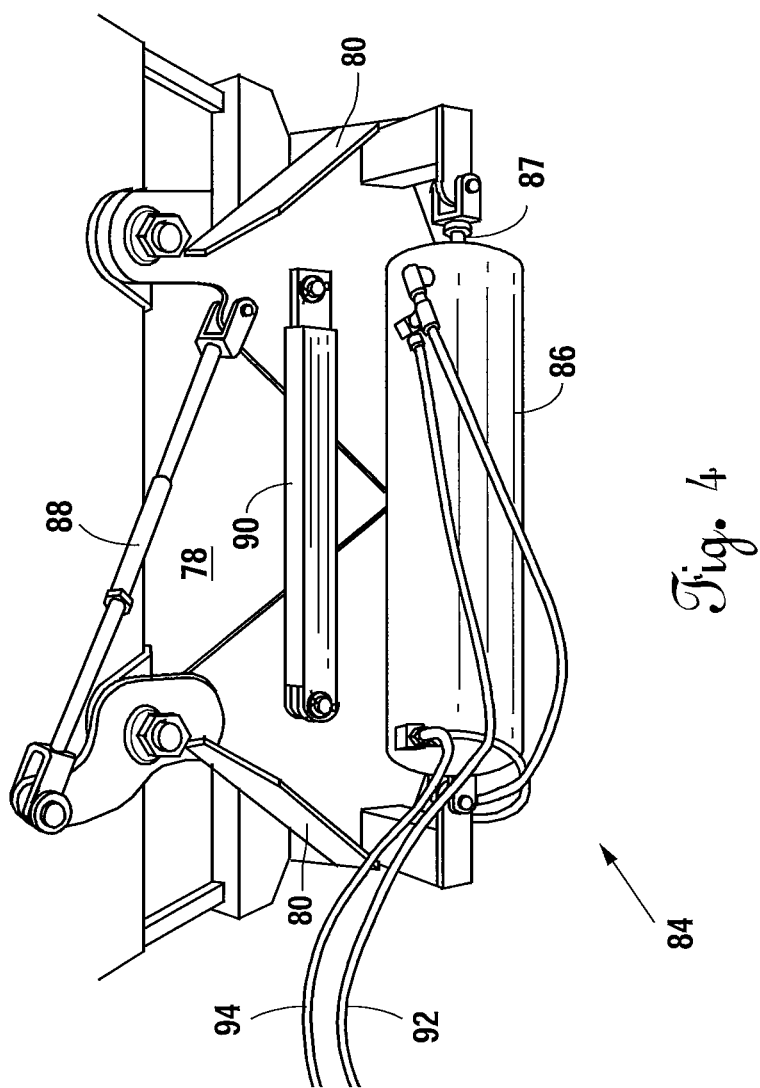
FIG. 4 is a perspective view of the rear gate assembly of the first embodiment.

Referring to FIG. 4, which shows the rear gate assembly 84 in more detail, the assembly 84 includes a cylinder assembly 86 having an arm 87, a linkage assembly 88, and a limiter 90. The cylinder 86 is mounted to each of the doors 80. The limiter 90 is mounted to each of the doors 80 and contains a plurality of apertures therethough evenly spaced such that a pin or other comparable fastener (not shown) may be inserted to vary the degree of opening of doors 80. The linkage assembly 88 is mounted to each of the doors 80 for synchronization. The cylinder 86 is connected to first and second fluid lines 92, 94 that provide a fluid communication path to the connection panel at the front end. Each of the doors 80 is pivotally connected to the end plates 78.

The rear gate assembly 84 is preferably operated pneumatically through one of the fluid lines 92, 94, but other embodiments contemplate hydraulic operation. To open the gate 84 from the closed position shown in FIGS. 3 and 4, the pressure within the cylinder assembly 86 is increased to cause the arm 87 to extend. This urges each of the doors 80 to rotate around their connection point. The linkage assembly 88 maintains synchronicity and alignment of the doors 80 during opening, whereas the limiter 90 can be set to prevent rotation of the doors beyond a desired point, thus allowing the operator to control the maximum area for material to flow through during unloading. The rear gate assembly 84 described herein is known in the art of belly-dump trucks. In this embodiment, the front gate assembly 82 is identical to the rear gate assembly 84.

Figure 5:
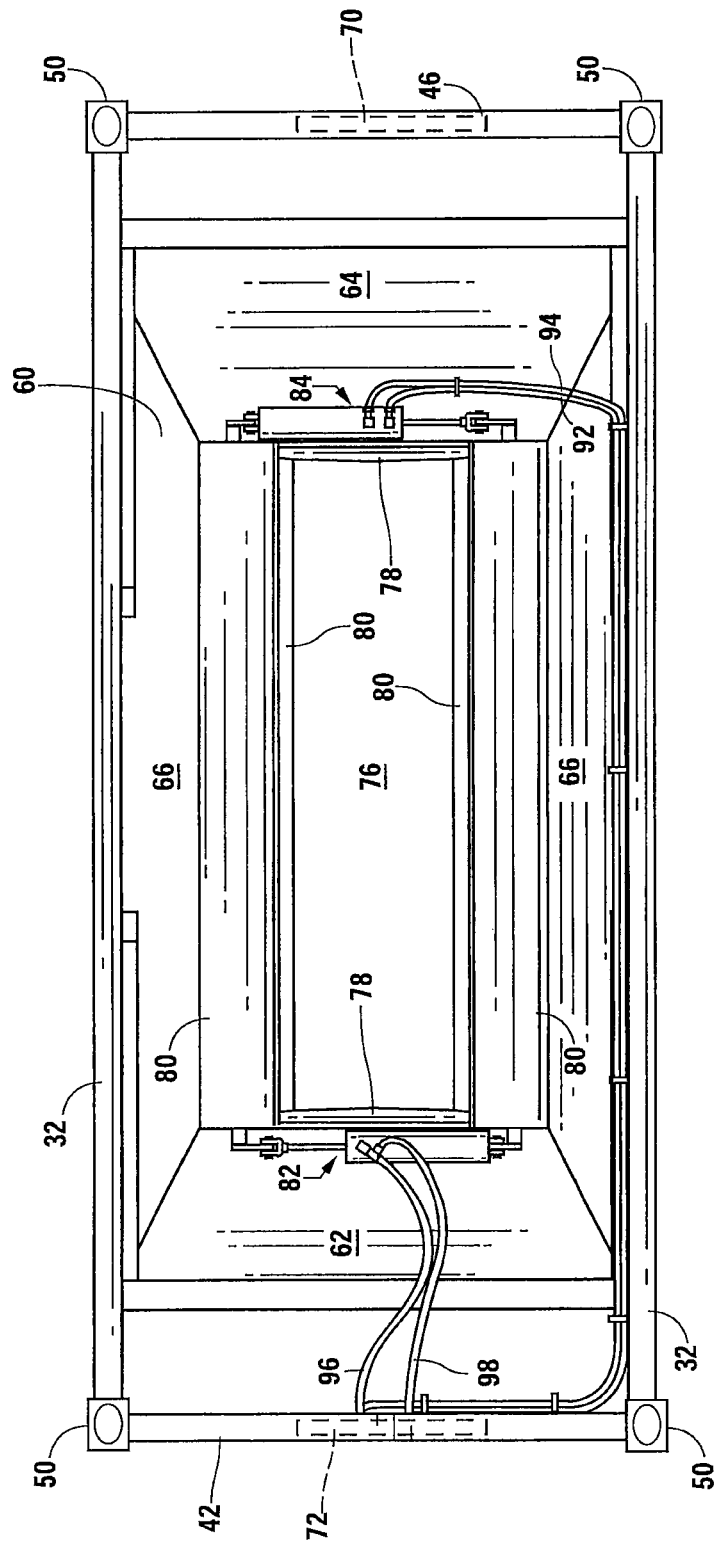
FIG. 5 is a bottom view of the first embodiment with the doors in an open position.

FIG. 5 shows the doors in an open position, which allows material in the hopper 60 to fall through the second opening 76. Fluid lines 92, 94 run from the rear gate assembly 84 to the connection panel mounted on the front end 22. Fluid lines 96, 98 run from the front gate assembly 82 to the connection panel 72.

Figure 6:
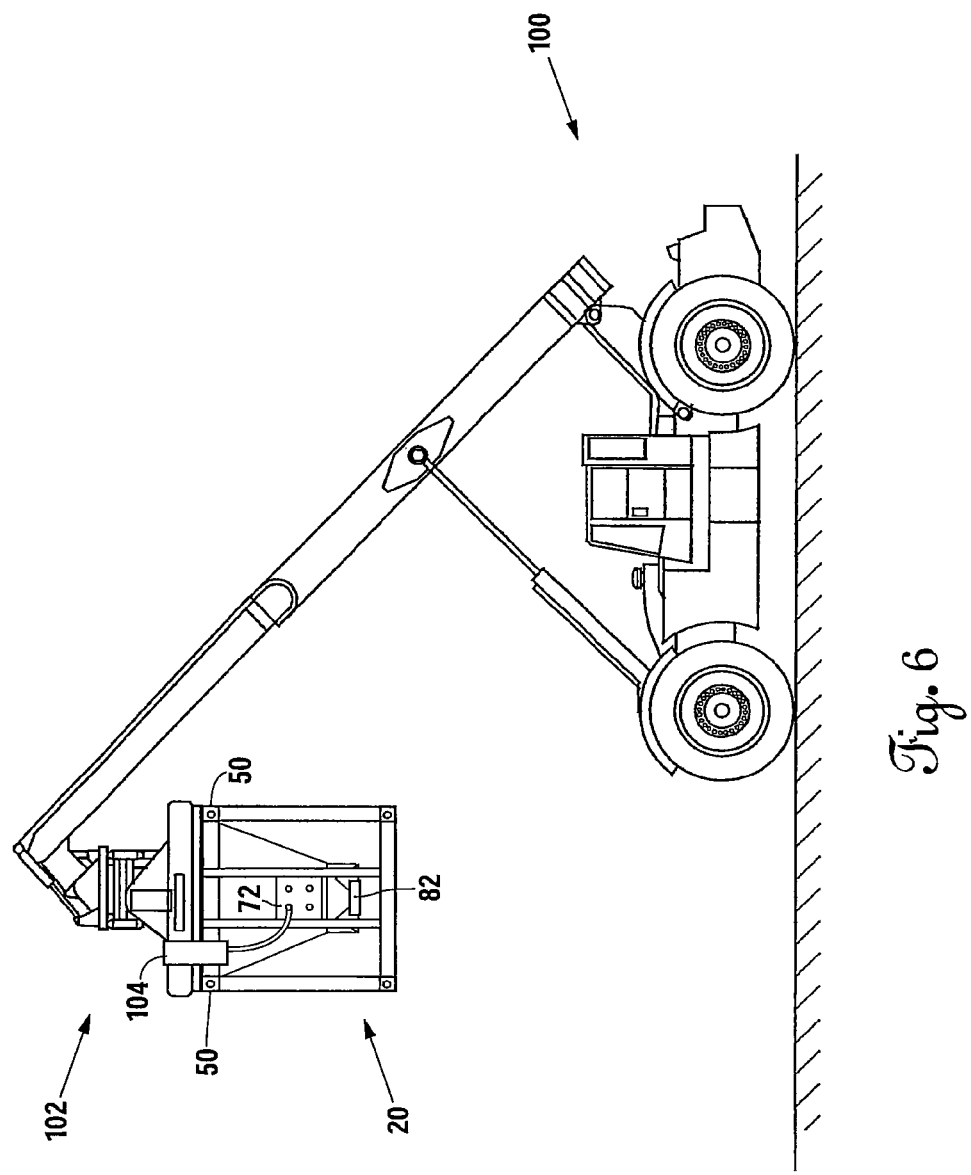
FIG. 6 is a side elevation of the first embodiment suspended from a container handler having an articulable arm.

FIG. 6 shows the embodiment described with reference to FIG. 1-5 suspended from a rough-terrain container handler 100, such as an RT240 made by Kalmar RT Center LLC of Cibolo, Tex. The handler 100 has twistlocks located on the end of an articulable arm 102 that are positioned in and engaged with the corner casters 50, as is known in the art. A pump 104 is mounted to the arm 102 and connected to the connector apparatus panel 72 to provide hydraulic or pneumatic control of the front and rear gate assemblies 82, 84 described with reference to FIGS. 4-5, thereby allowing control of the door position from the cab of the handler 100.

Figure 7:
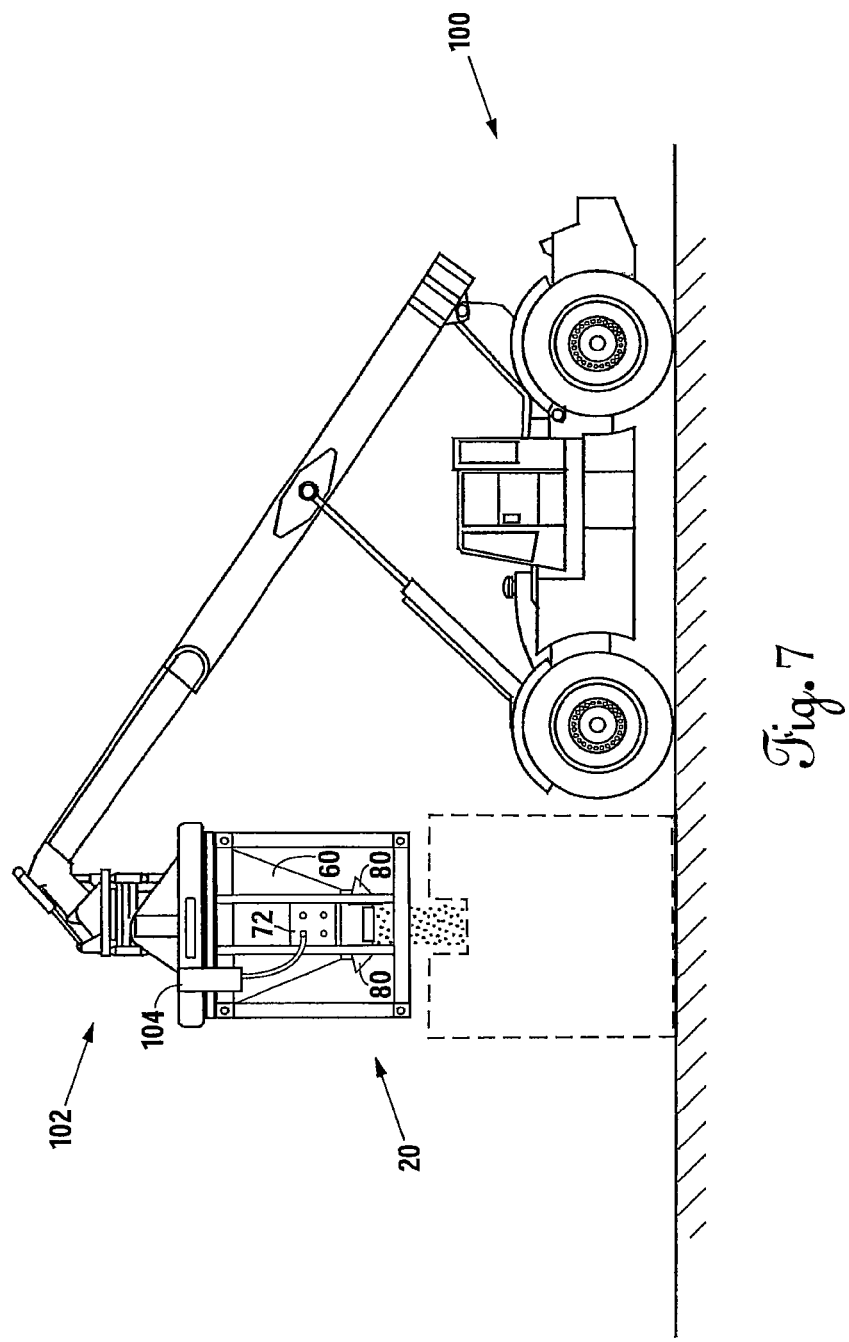
FIG. 7 is a side elevation of the first embodiment suspended from a container handler with the doors in an open position.

FIG. 7 shows the embodiment of FIG. 6 with the doors 80 in an open position, which allows material to egress from the hopper 60 through the second opening into a second container. The material may also be off-loaded into any other suitable receptacle or container (e.g., train, truck, pit, bender, hopper, pile, etc. . . . ).

Figure 8:
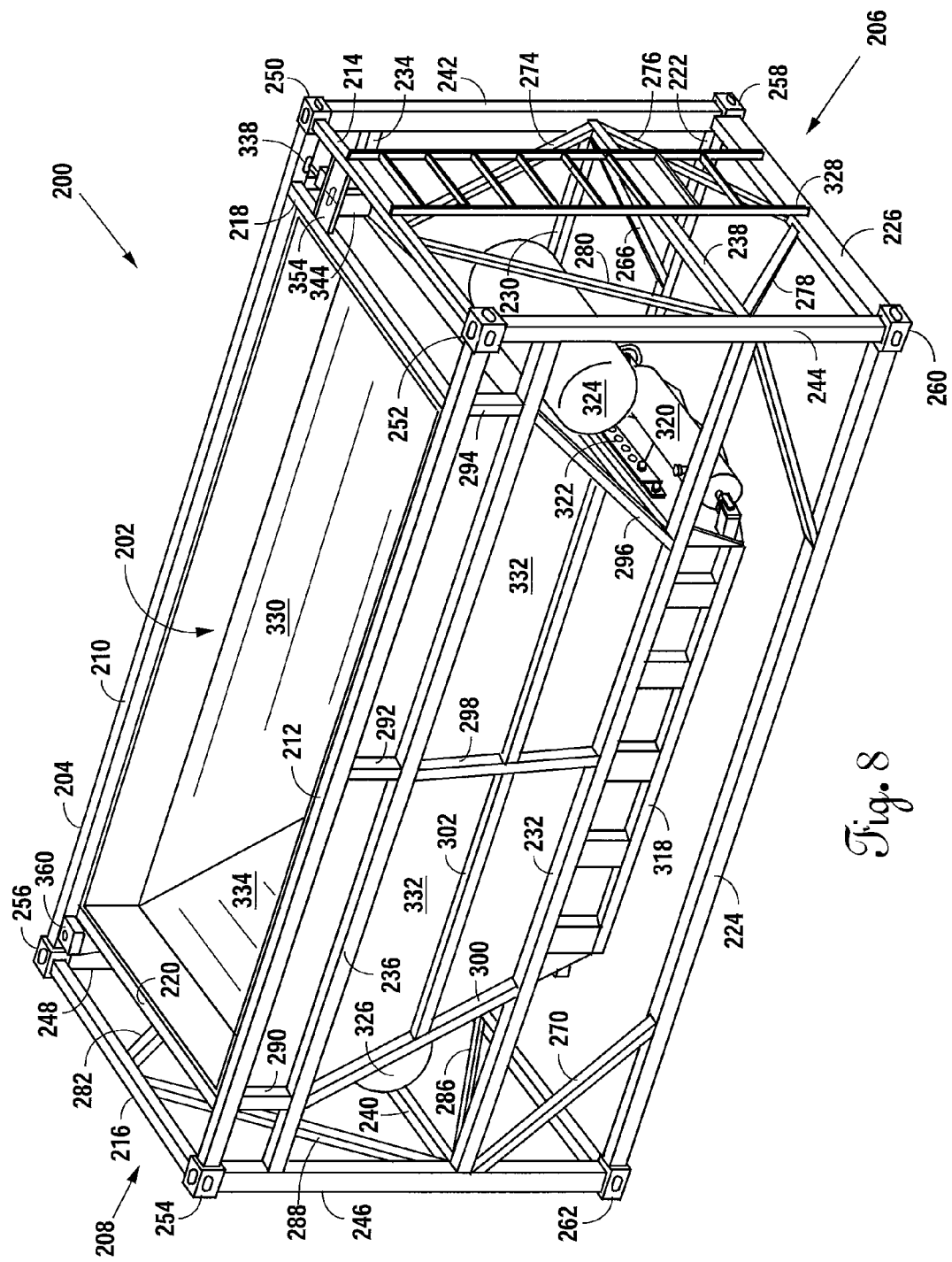
FIG. 8 is a perspective view of an embodiment of the present invention.

Referring now to FIG. 8, an alternative embodiment of the present invention is shown. Container 200 comprises a hopper 202 attached within frame 204. Container 200 has a first end 206 and a second end 208. Upper rail 210 and upper rail 212 connect to upper first end rail 214 and upper second end rail 216 forming an upper quadrilateral configuration. Corner castings 250, 252, 254, and 256 are positioned at the corners formed by the intersection of upper rail 210, upper rail 212, upper first end rail 214 and upper second end rail 216.

Similarly, lower rail 222 and lower rail 224 connect with lower first end rail 226 and lower second end rail 228 forming a corresponding lower quadrilateral configuration. Corner castings 258, 260, 262 and 264 are positioned at the corners formed by the intersection of lower rail 222, lower rail 224, lower first end rail 226 and lower second end rail 228.

Corner posts 242, 244, 246, and 248 are positioned between corner castings 250, 252, 254, and 256 on the upper quadrilateral configuration and corner castings 258, 260, 262 and 264 on the lower quadrilateral configuration connecting the upper quadrilateral configuration to the lower quadrilateral configuration.

Intermediate first end rail 238 is attached to corner post 244 on one end and corner post 242 on the other end at first end 206. Struts 274 and 280 extend up at an angle from where intermediate first end rail 238 is attached to corner posts 242 and 244 to attach to the center portion of upper first end rail 214. Struts 276 and 278 extend down at an angle from where intermediate first end rail 238 is attached to corner posts 242 and 244 to attach to the center portion of lower first end rail 226. Ladder 328 is attached to upper first end rail 214, intermediate first end rail 238 and lower first end rail 226 at first end 206.

Similarly, at second end 208, intermediate second end rail 240 is attached to corner post 246 on one end and corner post 248 on the other end. Struts 282 and 288 extend up at an angle from where intermediate second end rail 240 is attached to corner posts 246 and 248 to attach to the center portion of upper second end rail 216. Struts 284 and 286 extend down at an angle from where intermediate second end rail 240 is attached to corner posts 246 and 248 to attach to the center portion of lower second end rail 228.

Still referring to FIG. 8, upper first end support 218 is positioned between upper rail 210 and upper rail 212 at first end 206. Support 368 is positioned between upper first end support 218 and upper first end rail 214. Lever 338 is mounted on one side of support 368. Housing 354 is mounted on the other side of support 368 opposite lever 338. Housing 354 houses filter 344 and regulator 346 (see FIG. 16).

Upper second end support 220 is positioned between upper rail 210 and upper rail 212 at second end 208. Receiving block 360 is mounted on frame 204 at upper rail 210 between upper second end rail 216 and upper second end support 220. Air tanks 324 and 326 are mounted at first and second ends 206 and 208, respectively.

Still referring to FIG. 8, hopper 202 is comprised of side plate 330 attached to upper rail 210 and side plate 332 attached to upper rail 212. Hopper 202 also has end plate 334 attached to upper second end support 220 and end plate 336 (see FIGS. 10-11) attached to upper first end support 218. Vertical supports 290, 292, 294 and 298 and horizontal supports 236, 302 and 232 support both frame 204 as well as side plate 332 of hopper 202. Angled supports 296 and 300 provide additional support to frame 204 and side plate 332 of hopper 202. Similar support is provided to side plate 330.

Figure 9:
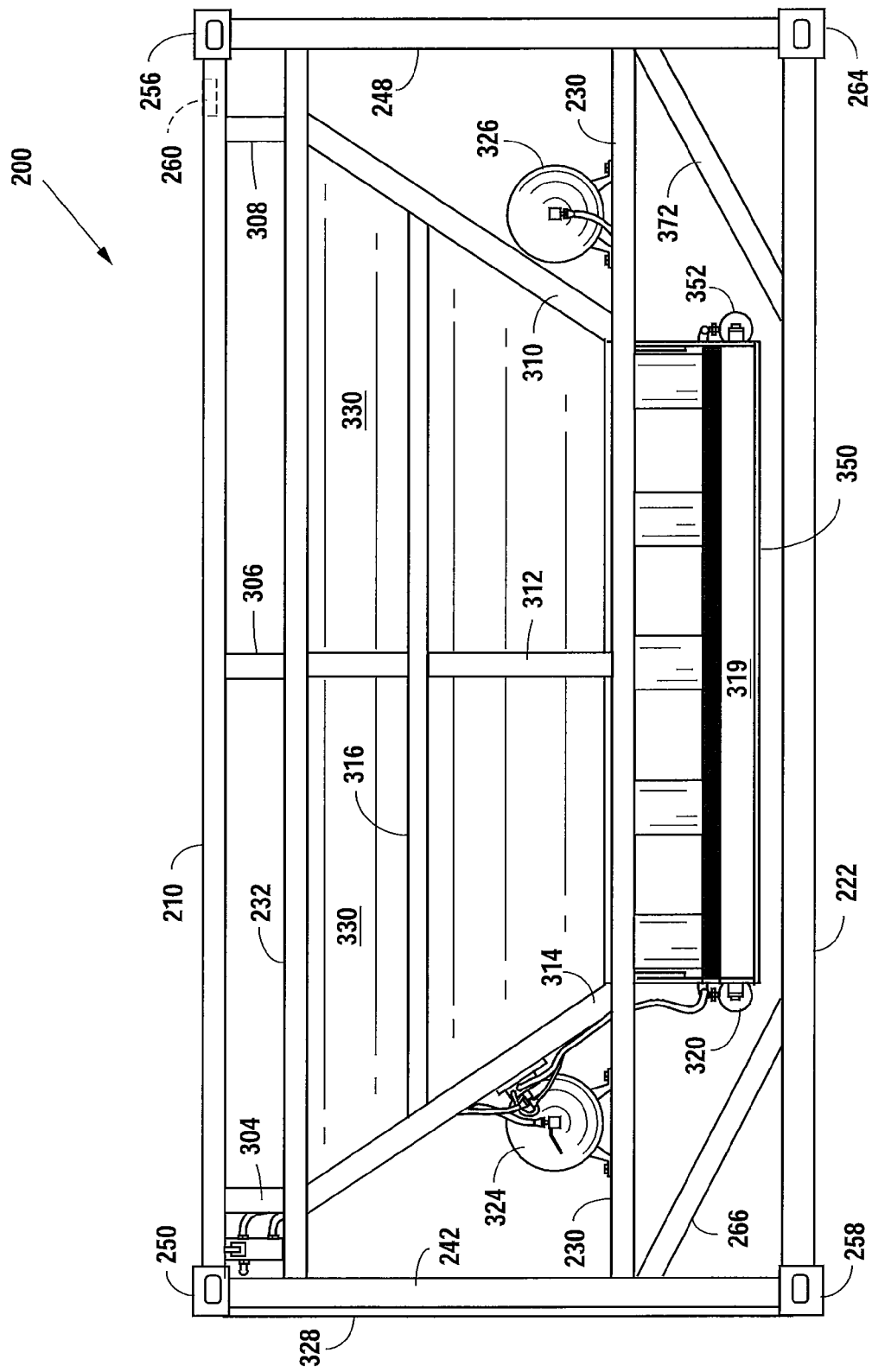
FIG. 9 is a side elevation view of an embodiment of the present invention.

Referring now to FIG. 9, a side view of container 200 is depicted. Container 200 is rotated 180° relative to the view in FIG. 8. Air tanks 324 and 326 are mounted on either end of container 200. Air tanks 324 and 326 are in fluid communication with cylinders 320 and 352. A splitter next to air tank 324 is used to split the air supply between air tank 324 and cylinder 320 of gate assembly. Cylinders 320 and 352 are attached at either end of bottom plate 319. Cylinders 320 and 352 actuate doors 348 and 350 (only one of which is shown) causing doors 348 and 350 to separate, thus, opening the bottom to empty contents.

Figure 10:
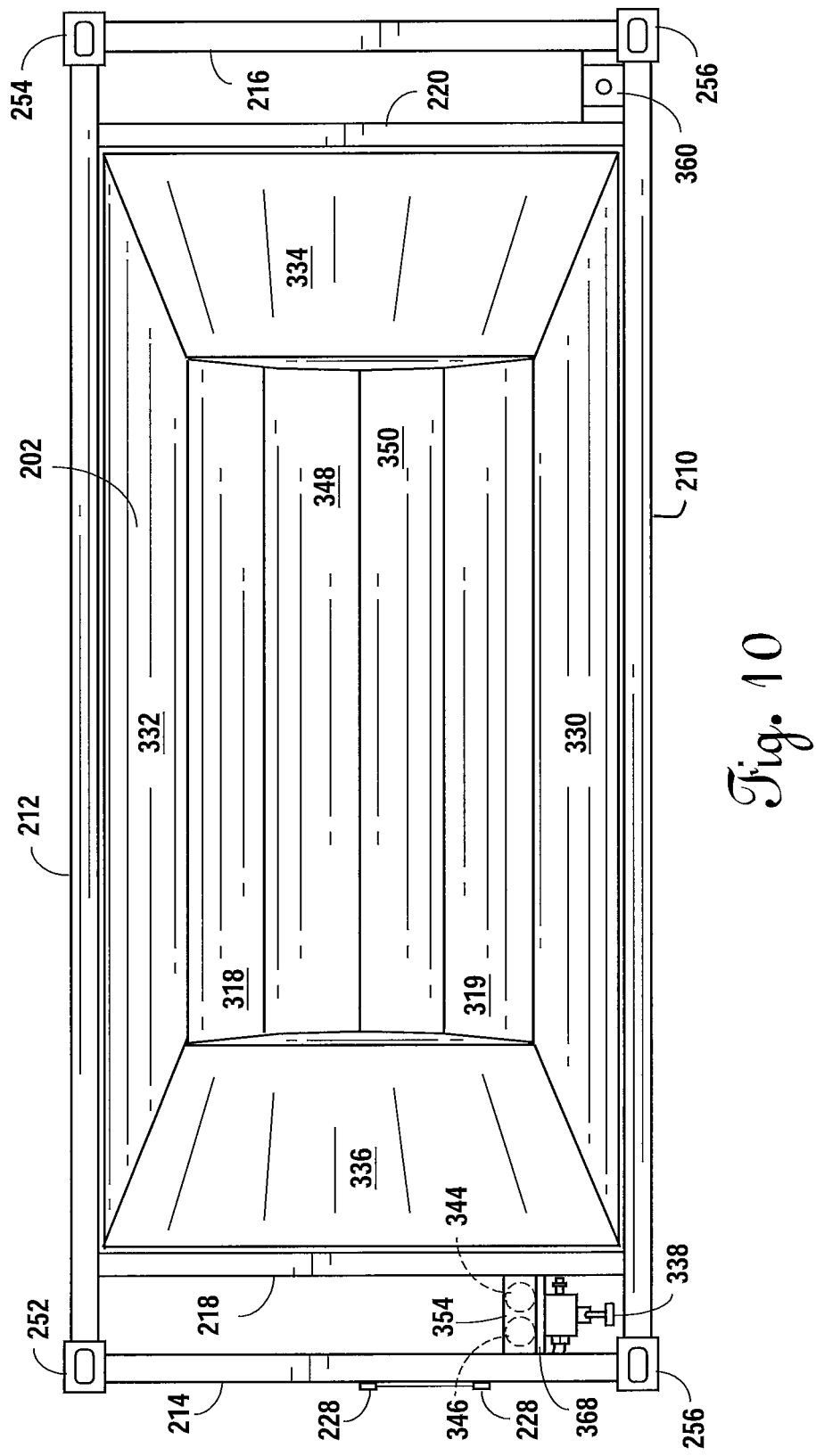
FIG. 10 is a top view of an embodiment of the present invention.

Referring now to FIG. 10, hopper 202 of container 200 is shown in a closed position. Bottom plate 318 connects to the bottom of side plate 332. Bottom plate 319 connects to the bottom of side plate 330. Doors 348 and 350 extend from bottom plates 318 and 319, respectively. When in a closed position, doors 348 and 350 are in close contact with each other to prevent contents from passing through the doors. Side plates 330 and 332 are vertically oriented. End plates 334 and 336 are angled in toward each other. Side plates 330 and 332 and end plates 334 and 336 form an inverted pyramid and define a chute.

Figure 11:
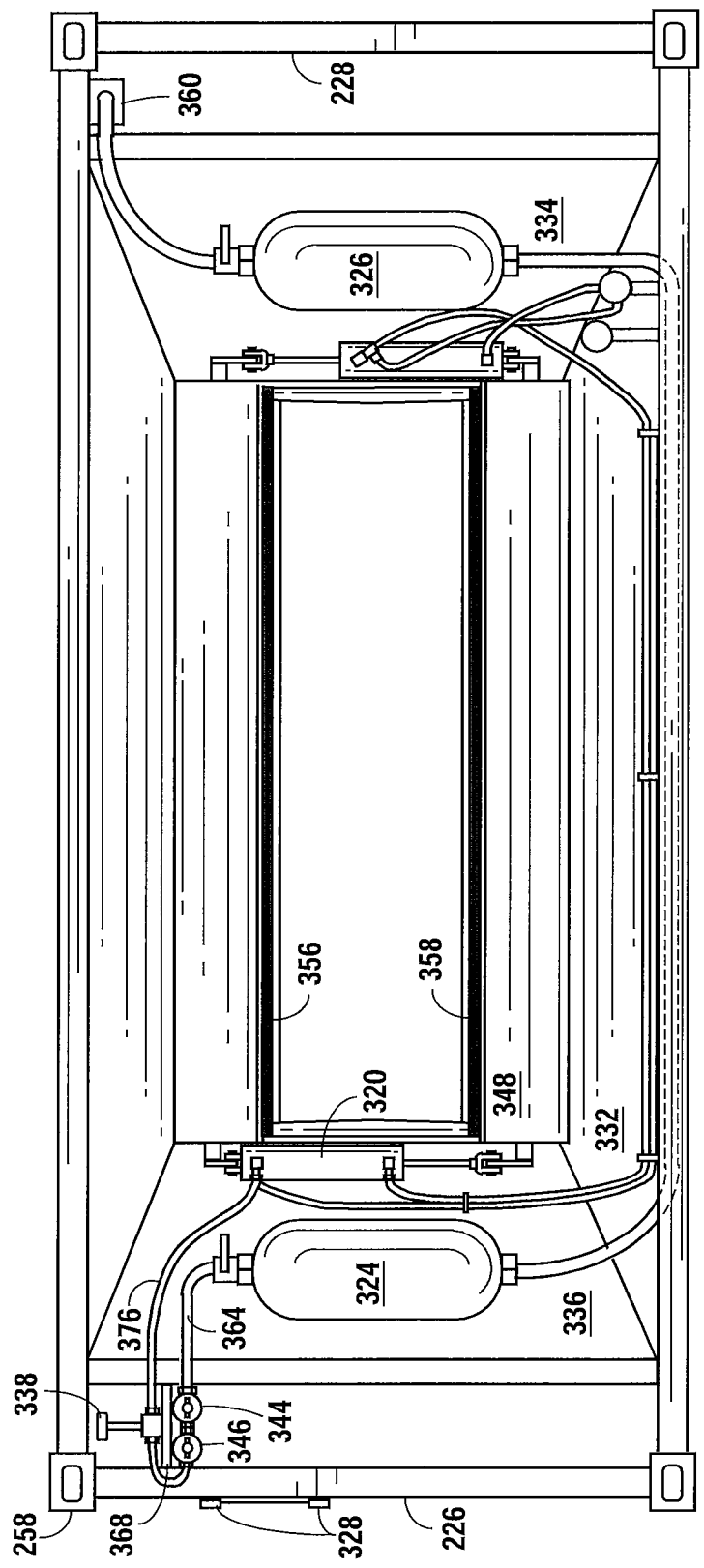
FIG. 11 is a bottom view of an embodiment of the present invention with the doors in an open position.

In FIG. 11, a bottom view of container 200 is shown in an opened position. Molding or trim 356 alongside door 350 and trim 358 alongside door 348 provide additional sealing capabilities when the doors are in a closed position, preventing contents of smaller sizes (e.g., sand) from passing through the doors. The angle of repose within hopper 202 is such that little, if any, content remains in hopper 202 once the bottom opens. Cylinders provide the fluid via fluid lines which actuates doors 348 and 350 to either an open position or a closed position.

Figure 12:
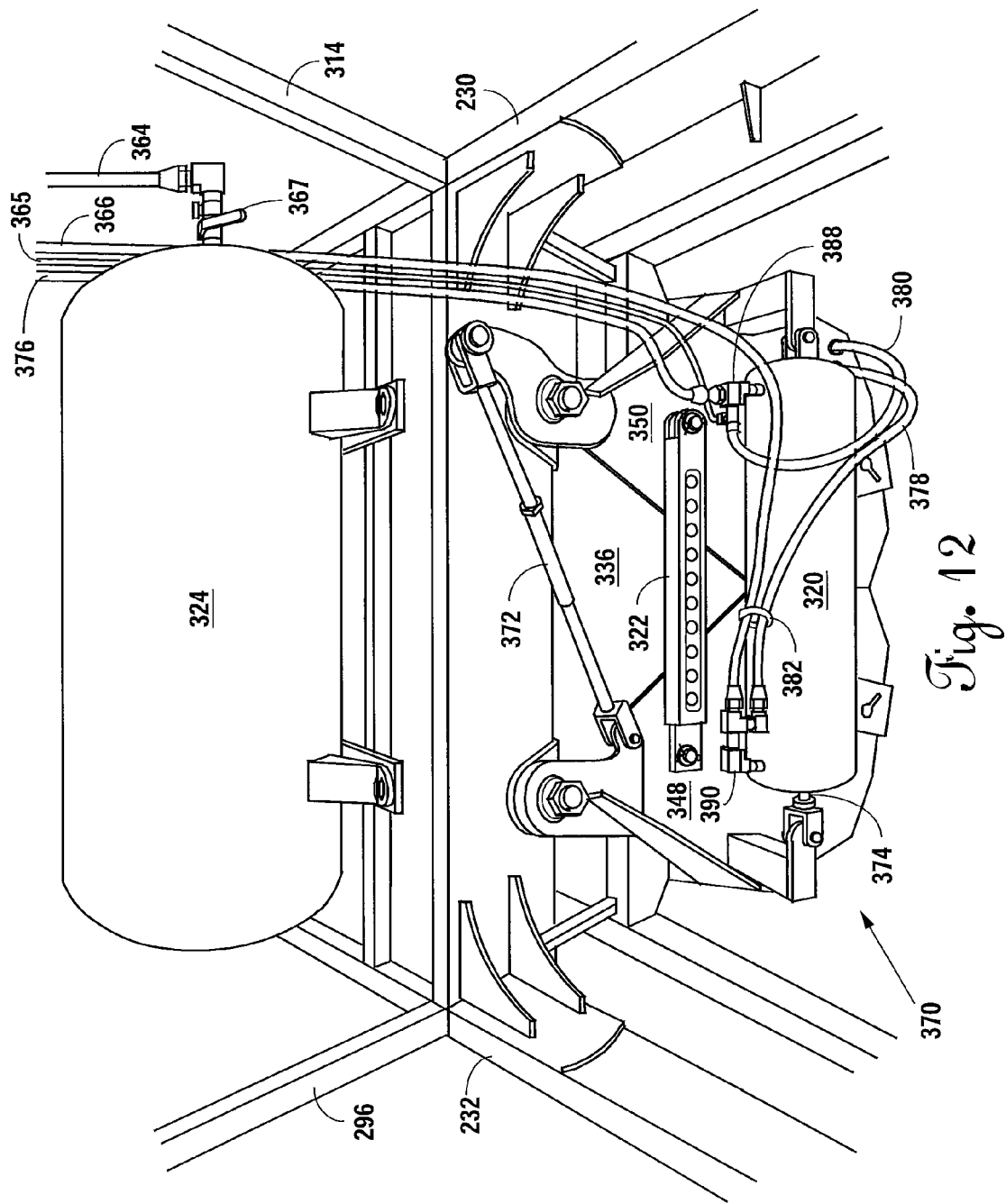
FIG. 12 is a perspective view of a first gate assembly of the present invention.

Referring now to FIG. 12, first gate assembly 370 is comprised of cylinder 320, limiter 322 and linkage assembly 372. Air tank 424 is mounted above first gate assembly 370. Fluid line 364 from lever 338 (not shown) feeds into air tank 324. Valve 367 may be rotated to either allow or cease the flow of fluid into air tank 324. Lines 365, 366 and 376 also from lever 338 (not shown) feed into cylinder 320 via connectors 388 and 390. Fluid lines may be held down using, for example, clip 382 or other similar fastener, to secure fluid lines in place. Fluid lines 378 and 380 are in fluid connection with second gate assembly 396 on second end 208 of container 200.

Doors 348 and 350 are connected to each end of limiter 322, respectively. A plurality of apertures along limiter 322 allows the operator to adjust the extent (how far or how narrow) to which the doors will open. This is accomplished by placing a pin (not shown) through one of a plurality of apertures along limiter 322. First end gate assembly 370 is mounted on end plate 336. The opening and closing mechanism of first end gate assembly 370 is as was discussed above in relation to FIG. 4.

Figure 13:
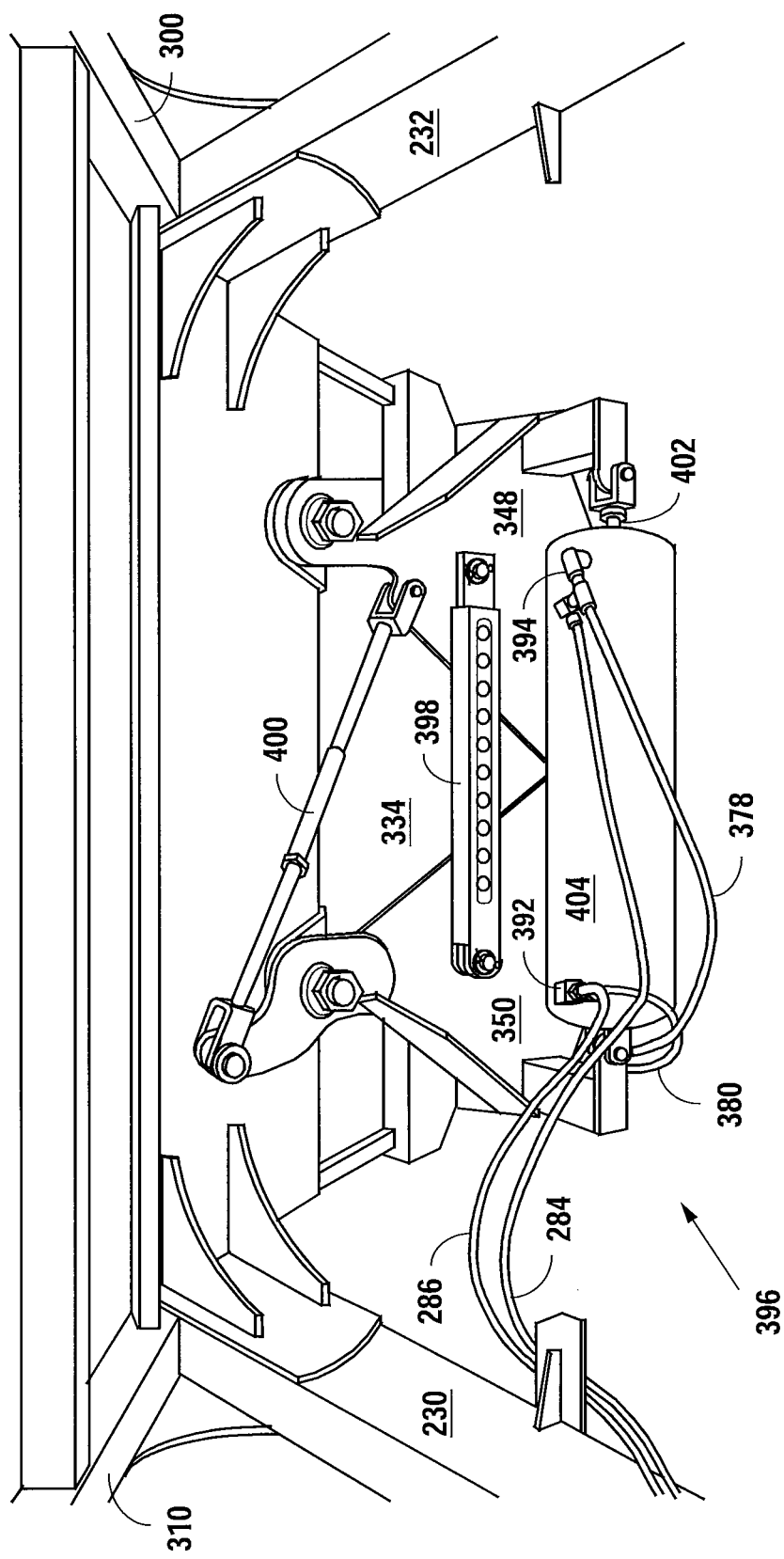
FIG. 13 is a perspective view of a second gate assembly of the present invention with the doors in a closed position.

The opening and closing mechanism of second end gate assembly 396 is similar. FIG. 13 depicts second gate assembly 396 at an end of container 200 opposite first gate assembly 370. Doors 348 and 350 are in a closed position. The components of each gate assembly 370 and 396 are similar in structure and function, as described above.

Figure 14:
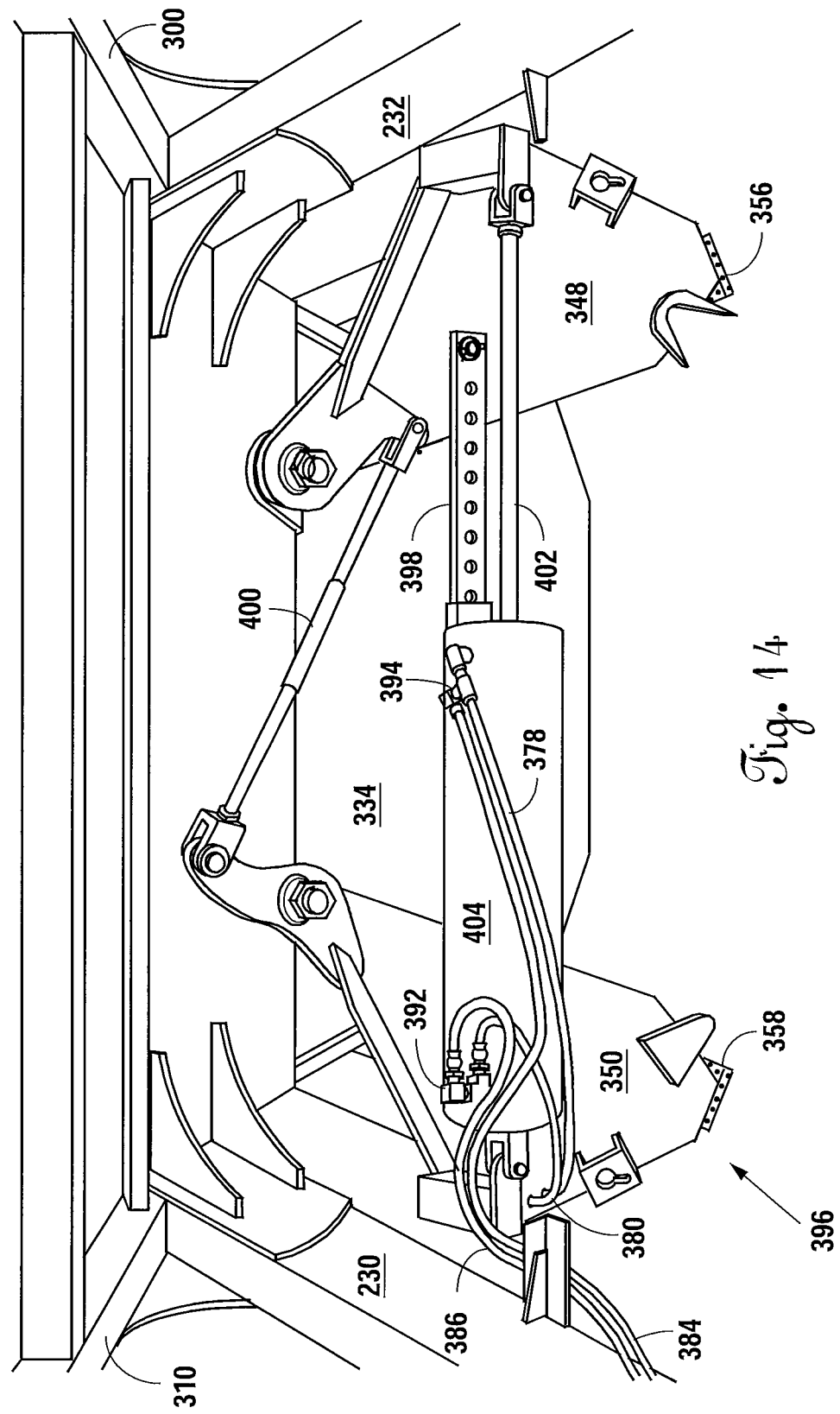
FIG. 14 is a perspective view with respect to FIG. 13 of the second gate assembly of the present invention with the doors in an open position.

Referring now to FIG. 14, second gate assembly 396 is shown in an opened position. Trim 356 and 358 are shown attached alongside the lengthwise edge of doors 348 and 350, as shown in FIG. 14.

Figure 15:
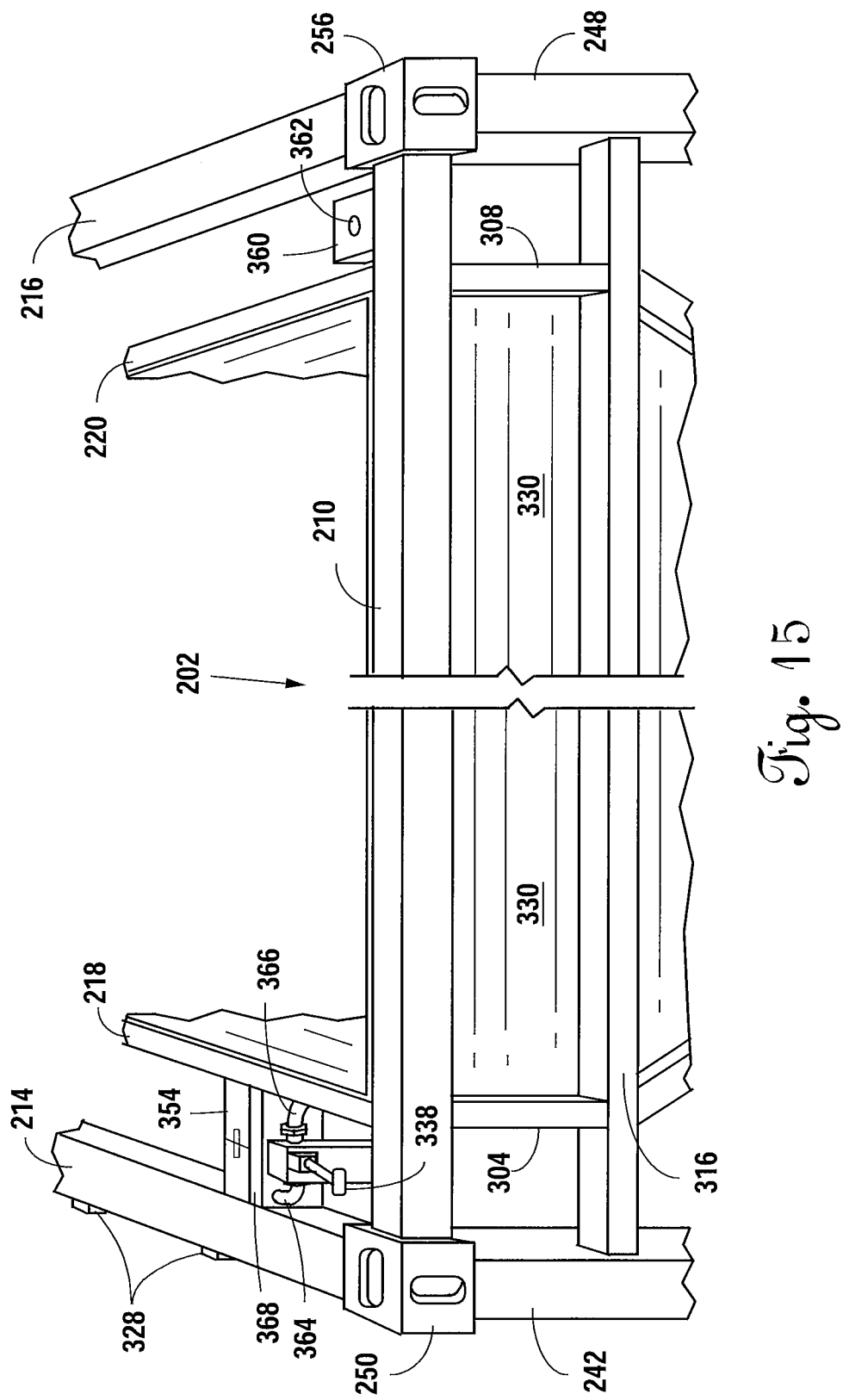
FIG. 15 is a perspective view of the top side of an embodiment of the present invention.
Figure 16:
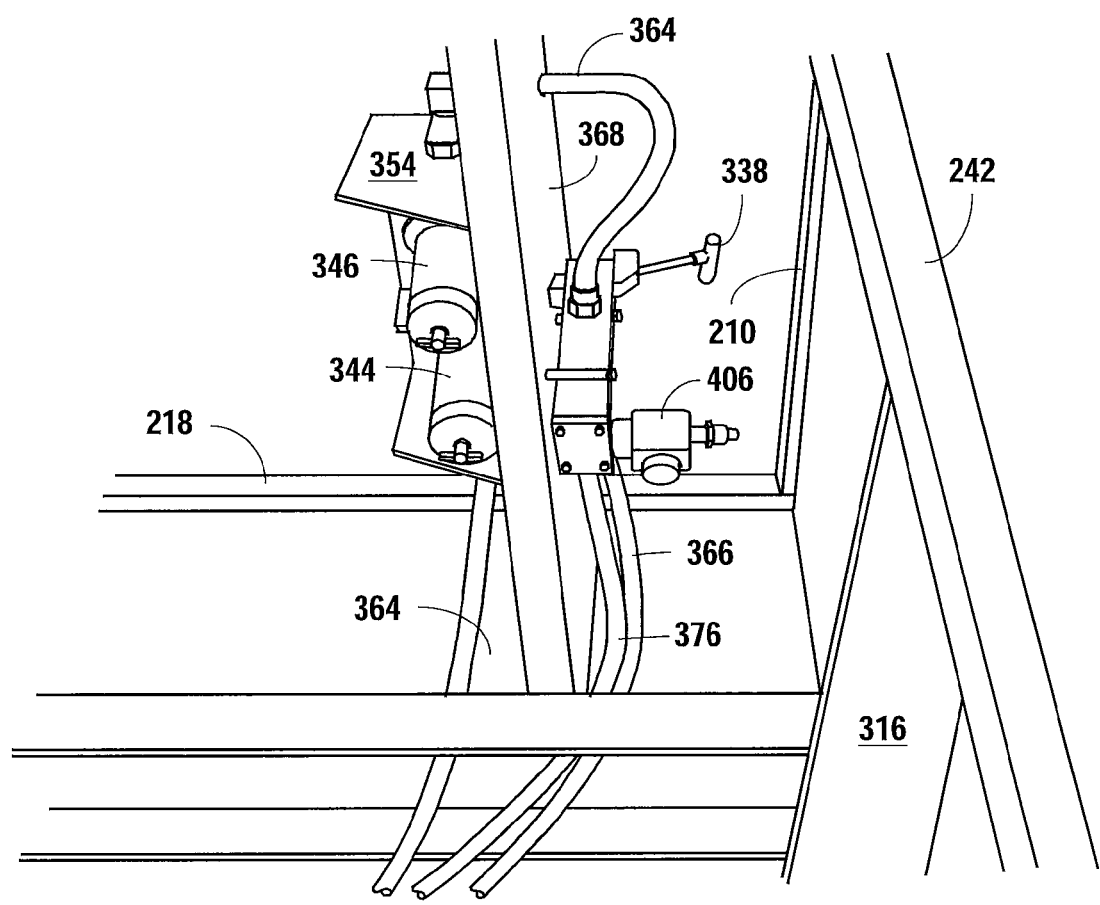
FIG. 16 is a bottom perspective view of the lever of an embodiment of the present invention.

Referring now to FIGS. 15 and 16, lever 338 is mounted to support 368. Housing 354 is also mounted on support 368 but opposite lever 338. In one embodiment, housing 354 may be two members fastened together with a fastener, such as a screw, bolt or the like, as shown in FIG. 15. In an alternative embodiment, housing 354 may comprise a single piece. Fluid line 364 extends from lever 338 through an aperture in support 368 and connects to air filter 344 (not shown) and regulator 346 (not shown) within housing 354 before feeding to air tank 324 mounted below. Fluid lines 366 and 376 extend from lever 338 to feed to cylinder 320 of first end gate assembly 370 (See FIG. 12). Receiving block 360 is mounted to upper rail 210 and positioned between upper second end rail 216 and upper second end support 220. Bulk material contents (not shown) are deposited within hopper 202 for storage and/or transportation.

Figure 17:
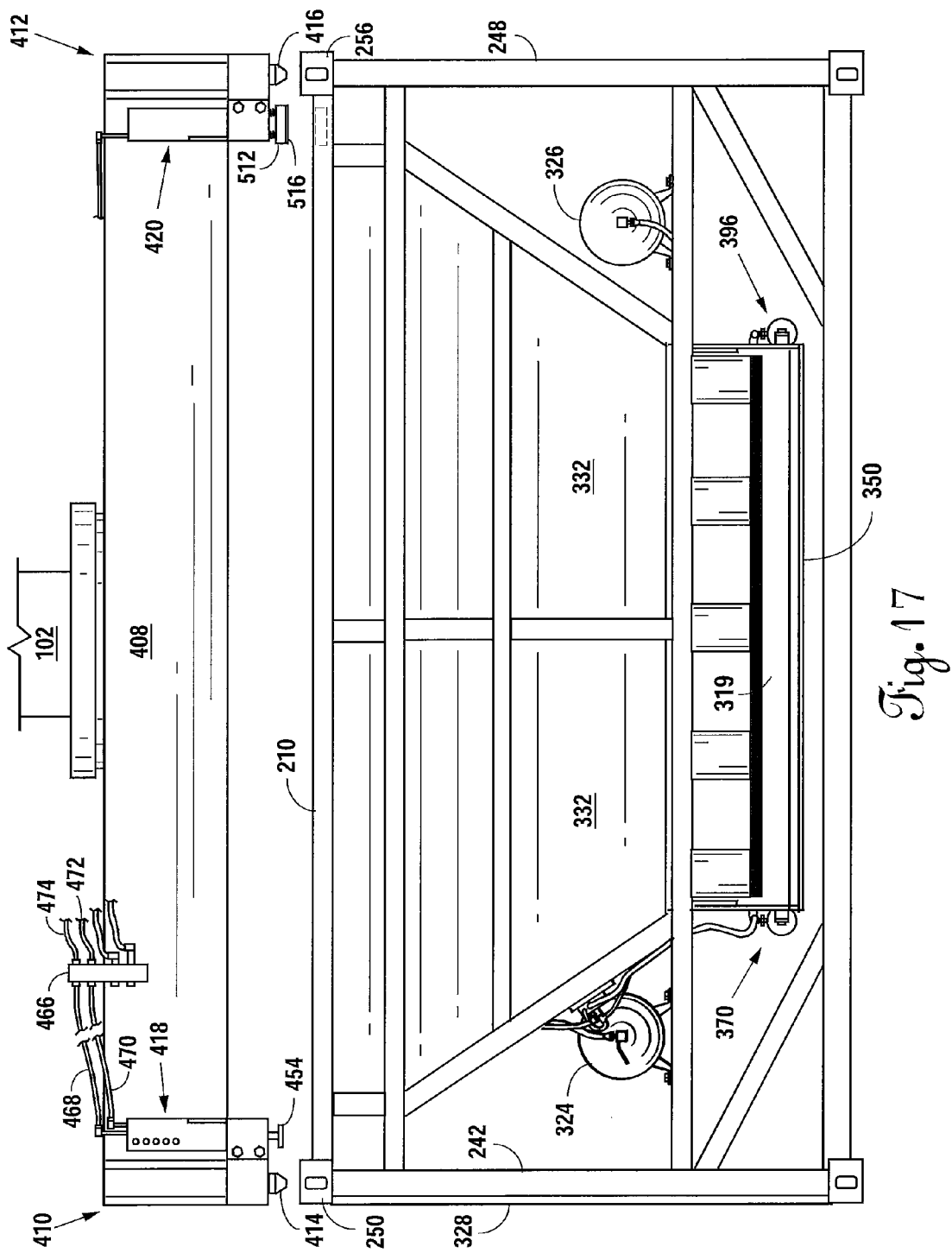
FIG. 17 is a side elevation view of another embodiment of the present invention showing a top handler prior to engagement with the container.

As viewed from the cabin of rough terrain container handler 100, FIG. 17 depicts container 200 of the present invention prior to engagement with rough terrain container handler 100. More specifically, articulable arm 102 of rough terrain container handler 100 connects to top handler 408. Top handler 408 is the portion of rough terrain container handler 100 that engages with heavy equipment, such as container 200. Plunger system 418 is mounted at first end 410 of top handler 408. Fluid lines 468 and 470 connect plunger system 418 to auxiliary system 466 also mounted on top handler 408. Auxiliary system 466 provides the necessary means (e.g., hydraulic fluid) for actuating plunger system 418.

Air transfer system 420 is mounted at second end 412 of top handler 408. Air transfer system 420 is connected via a hose to an air compressor on the rough terrain container handler 100 (see FIGS. 22-23). Twist locks (of which only twist locks 414 and 416 are shown) are aligned with and engage with corresponding corner castings (of which only corner castings 250 and 256 are shown) on container 200, effectively securing top handler 408 to container 200. Securing the twist locks may be done remotely from within the cabin of rough terrain container handler 100.

Alignment of the twist locks on top handler 408 with the corresponding corner castings on container 200 is tantamount to alignment of plunger system 418 with lever 338 on first end 410 and alignment of delivering block 512 of air transfer system 420 with receiving block 360 of air transfer system 420 on container 200. Only when twist locks are properly aligned with the corresponding corner castings can proper engagement between top handler 408 and container 200 be performed.

Figure 18A:
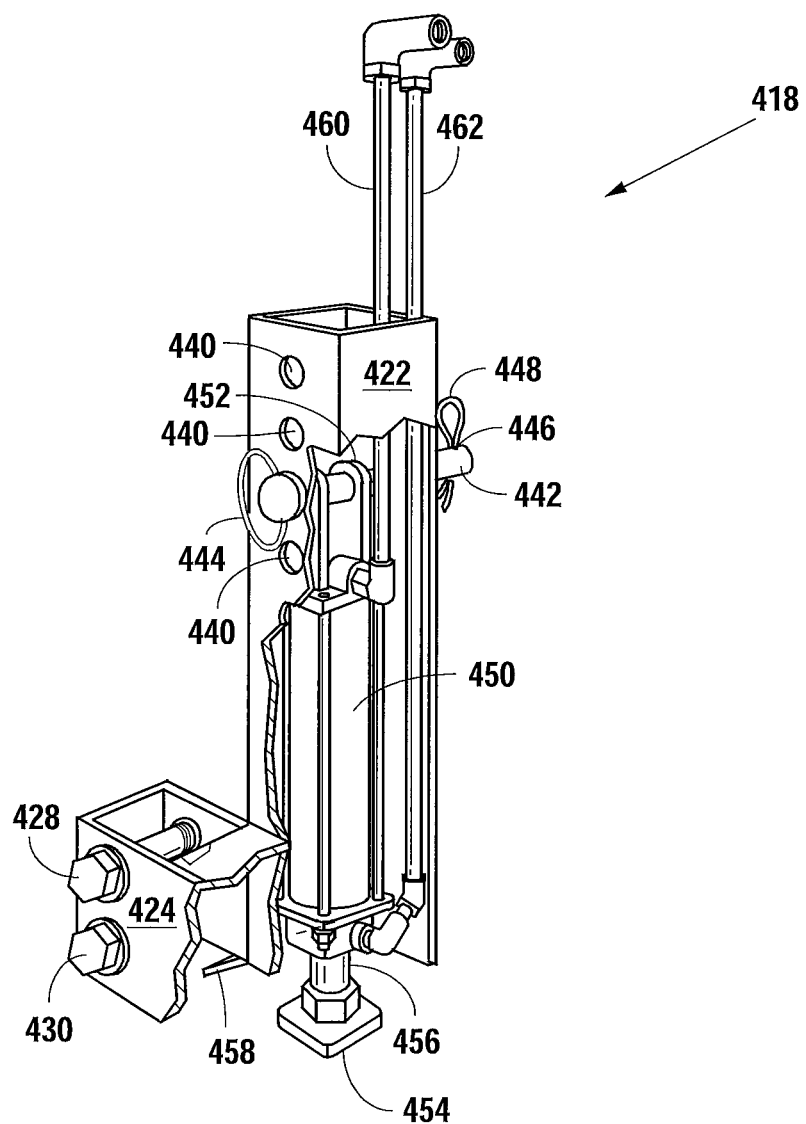
FIG. 18A is a perspective view of the plunger system of the present invention.
Figure 18B:
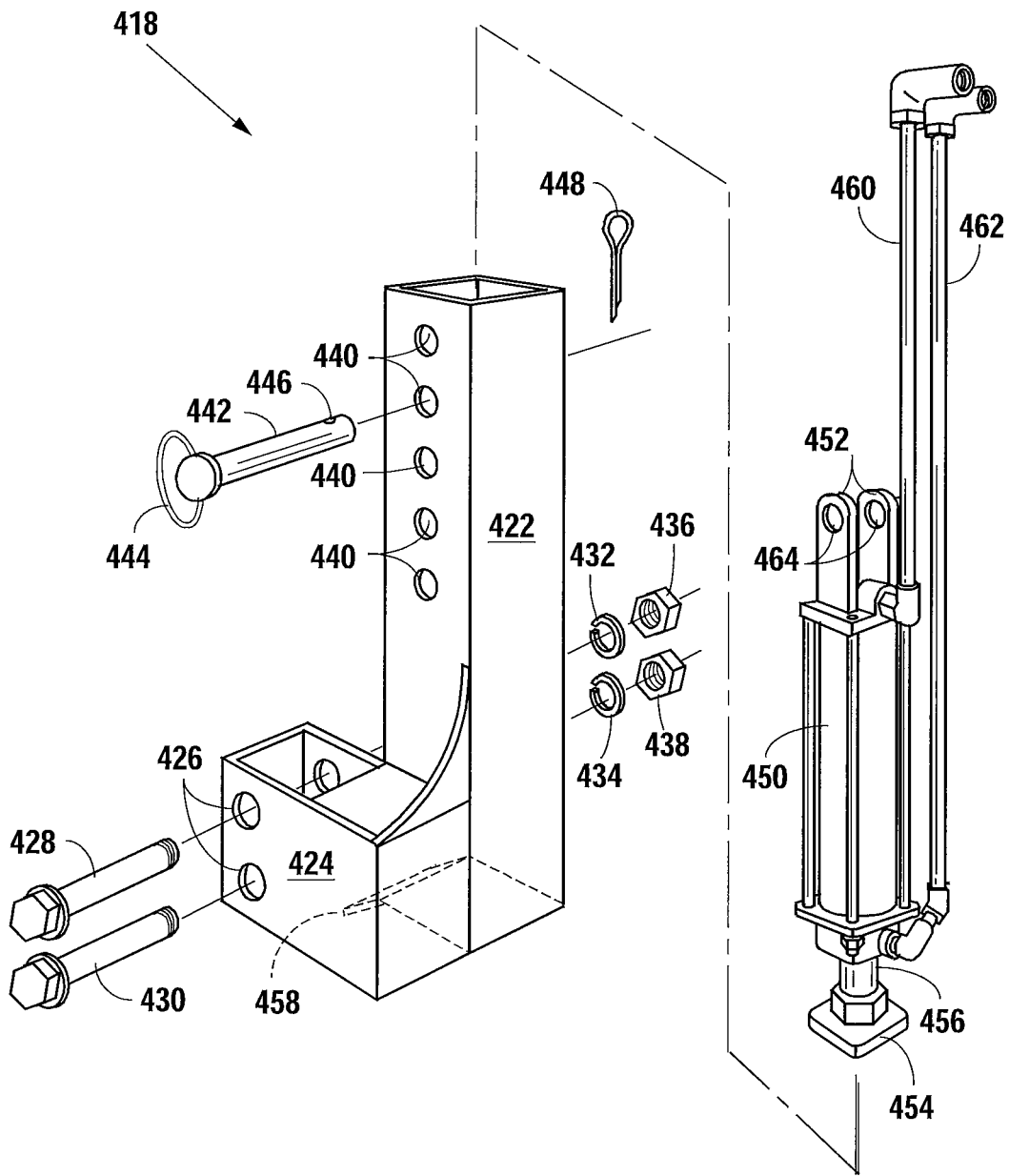
FIG. 18B is an exploded view of a plunger system of the present invention.

Now referring to FIG. 18A and 18B, plunger system 418 is comprised of housing 422 having a plurality of apertures 440 on opposite sides of housing 422. Housing 422 has a square configuration. However, other comparable configurations may also be used. Guide lip 458 is attached to the bottom of housing 422 and extends down and outward at an obtuse angle of approximately 130° relative to a horizontal plane along the bottom of housing 422.

Mounting bracket 424 has apertures 426. Mounting bracket 424 is positioned between corresponding brackets (not shown) on top handler 408. Fasteners 428 and 430 then traverse first one side of the corresponding brackets on top handler 408 then through apertures 424 and 26 of mounting bracket 424 then the other side of the corresponding brackets on top handler 408. Lock washers 432 and 434 and nuts 436 and 438 are placed and threaded on fasteners 428 and 430 to firmly secure housing 422 to top handler 408. Fasteners 428 and 430 may be bolts but may also include other comparable fasteners, such as screws, pins or the like.

Cylinder 450 is slidable within housing 422. Clevis 452 is at the top end of cylinder 450 and has apertures 464 therethrough. Spacers (not shown) on either side of the cylinder positioned between the internal sides of housing 422 and cylinder 450 to stabilize and maintain cylinder 450 in a vertical configuration as cylinder 450 slides up and down within housing 422. Clevis pin 442 having cross-hole 446 at the end is aligned with and traverses apertures 464 of clevis 452 and plurality of apertures 440 on opposite sides of housing 422. Clevis pin 442 may also include a ring 444 at the end opposite from cross-hole 446 to facilitate removal of clevis pin 442. Split pin or clip 448 then traverses through cross-hole 446 of clevis pin 442 after clevis pin 442 has passed through apertures 440 (on either side of housing 422) and apertures 464 (of clevis 452) to secure clevis pin 442, thereby maintaining cylinder 450 in the desired position within housing 422. Plunger or "foot" 454 is in fluid connection with cylinder 450 and attached to rod 456 extending from cylinder 450.

Hydraulic fluid extension lines 460 and 462 connected at one end to opposite ends of slidable cylinder 450. The opposite ends hydraulic fluid extension lines 460 and 462 are connected to auxiliary system 466 mounted to top handler 408 (see FIGS. 17 and 20). Hydraulic fluid extension lines 460 and 462 have a male hydraulic connector and a female hydraulic connector at the top for supplying and returning hydraulic fluid, respectively, with corresponding male and female connectors at auxiliary system 466.

Figure 21:
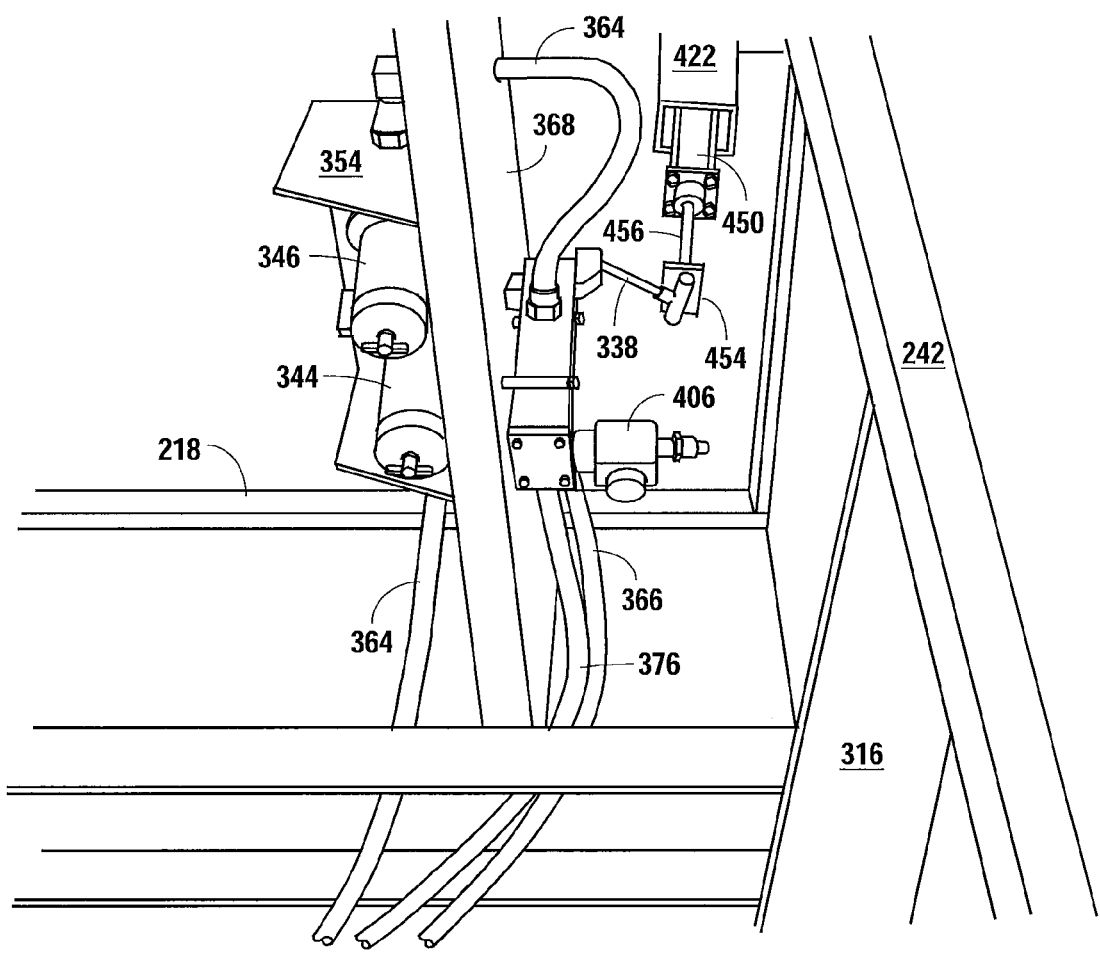
FIG. 21 is a perspective view of the lever engaged by the plunger of the present invention.

In use, plunger system 418 is actuated hydraulically via hydraulic fluid lines 474 and 472 connected to an auxiliary unit on the top handler 408 (see FIGS. 17 and 20). Cylinder 450 activates plunger 454 by outwardly extending rod 456 causing plunger 454 to move in a vertical orientation (either up or down). Plunger 454 is lowered until plunger 454 makes contact with lever 338 on container 200 (see FIG. 21). Guide lip 458 guides plunger 454 during descent ensuring plunger 454 contacts the same area (lever 338) every time. Lever 338 on container 200 is spring-loaded and biased toward an upward first position. Plunger 454 continues its downward motion until overcoming the upward bias of lever 338 and lever 338 has been pushed to a downward second position. The length that plunger 454 descends may be adjusted to a desired fixed length so as to not damage lever 338 when plunger 454 engages lever 338. Lever 338 is pushed down sufficiently to cause the air pathway of the system to open, allowing air to actuate the gate assemblies, thus causing bottom doors 348 and 350 of container 200 to open. This can also be done (i.e., opening the bottom doors) remotely.

Once the contents with the container have been expelled, cylinder 450 withdraws rod 456 causing plunger 454 to raise thereby releasing pressure against lever 338. Lever 338 then moves toward the biased upward first position, thereby closing the air pathway, thus causing doors 348 and 350 to close.

Figure 19A:
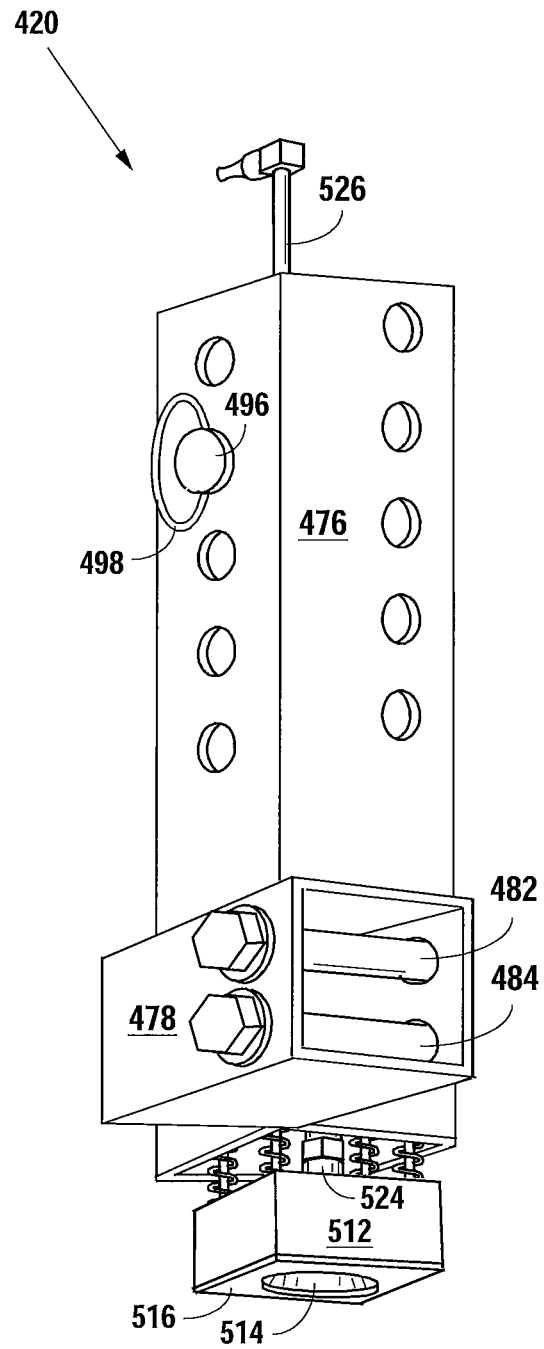
FIG. 19A is a perspective view the portion of the air transfer system of the present invention with reference to FIG. 19A.
Figure 19B:
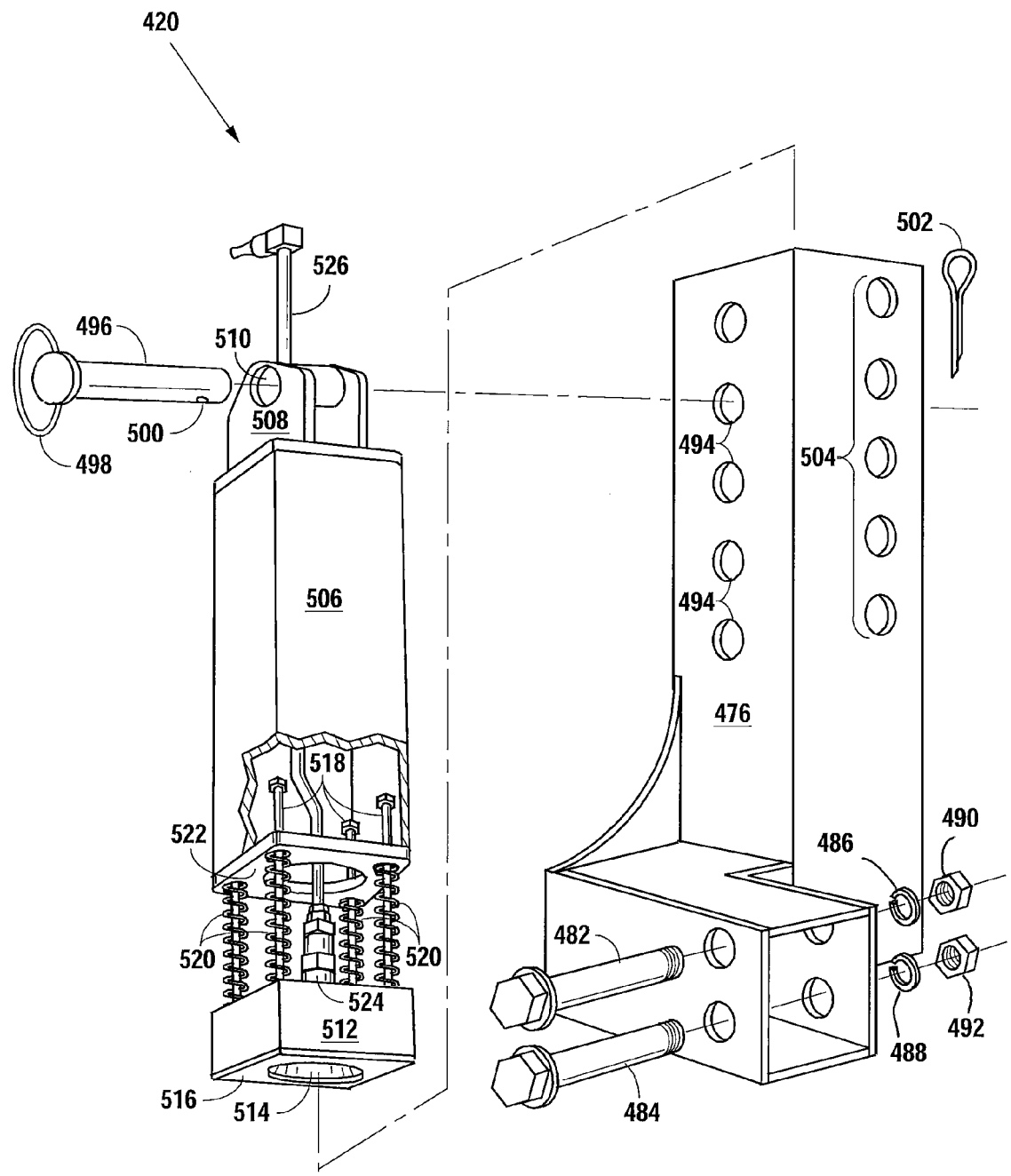
FIG. 19B is an exploded view of the portion of the air transfer system of the present invention.

Referring now to FIGS. 19A and 19B, air transfer system 418 contains components on rough terrain container handler 100 and on container 200. Housing 476 is attached to top handler 408 via mounting bracket 478. Housing 476 is cuboidal in configuration but may also be configured in other shapes, e.g., cylindrical. Housing 476 has a plurality of apertures 494 on opposing sides of housing 476. A second plurality of apertures 504 are on the sides adjacent to the side containing plurality of apertures 494. Second plurality of apertures 504 are off-center and spaced in between the apertures of plurality of apertures 494, as shown in FIG. 19B. Column 506 slides within housing 476. Block 512 (with 4 springs 520) is attached at the bottom of column 506.

Clevis 508 at the top of column 506 allows for clevis pin 496 to traverse therethrough permitting adjustment of column 506 within housing 476 at a height desireable by the user. Column 506 can slide within housing 476 and be fixed in a particular position by using clevis pin 496 traversing through one of the plurality of apertures 494 through aperture 510 of clevis 508 at the top of the column 506 and through a corresponding plurality of holes 494 (not shown) on the opposite side of housing 476. A clip or split pin 502 is then used to hold clevis pin 496 in place securing the position of column 506 within housing 476. In this fashion, the extent to which block 512 extends from housing 476 can be adjusted. A preferable configuration for air transfer system 420 is to have block 512 extended about ½" higher in elevation than twist lock 416 (see FIG. 17) prior to engagement of top handler 408 to container 200. In other words, when viewing at eye level, twist lock 416 extends down about ½" further than block 512. A sensor (not shown) behind twist lock 416 indicates when the corner of top handler 408 are seated correctly on the corner of container 200.

Gasket 516 is attached to the bottom surface of the top delivering block 512. Gasket 516 is rubber (though other comparable compressible material may also be used. Gasket 516 is about a quarter (¼") inch thick and covers the bottom surface of the delivering block 512. Gasket 516 has an opening in alignment with recessed portion or area 514. Gasket 516 may be adhered to the bottom surface of the top block 512 through the use of an adhesive. Alternatively, gasket 516 may also be fastened to the bottom surface of the delivering block 512. In such manner, four holes may be at the corners of gasket 516 in alignment with four corresponding holes on the bottom surface of the delivering block 512. Fasteners, such as screws or the like, may be fastened with washers to secure the gasket onto the block. Once the gasket has been sufficiently worn through use, the gasket may easily be switched out and replaced by a new gasket. However, due to the minimal use of the gasket throughout the life of the air transfer system, a single gasket most likely will last for quite some time.

The top surface of the top or delivering block 512 is releasable attached to column 506 at end 522 via four bolts 518. A spring 520 surrounds each bolt 518. Springs 520 are used to bias delivering block 512 on top handler toward corresponding opposing receiving block 360 mounted on the frame at the top of container 200. Springs 520 may be heavy duty helical or coil springs. However, other comparable types of springs may also be used.

Figure 22:
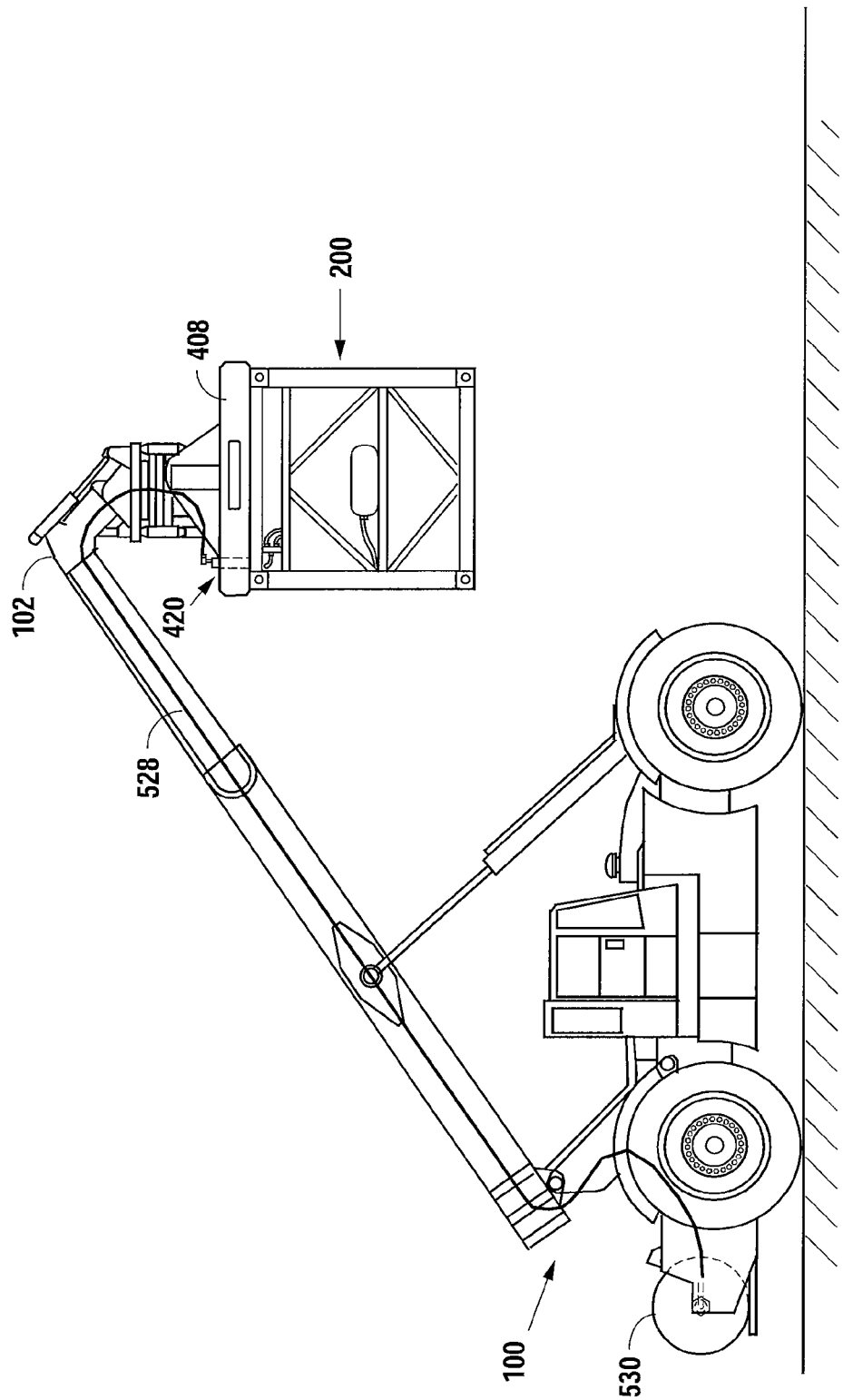
FIG. 22 is a side elevation view showing a rough terrain container handler carrying the container.

Four screws 518 inside springs 520 are used to adjust the tension of springs 520 and as well as the distance block 512 remains from column 506. The screw sizes are three eights of an inch (⅜") but can be larger which may be advantageous to minimize any kink that may occur with springs 520 as delivering block 512 is being compressed toward and against receiving block 360 on container 200. Air connector 524 is fastened (e.g., threaded) into the center portion of delivering block 512. Hose or air line 526 connects to air connector 524 at one end. Hose 526 is secured across articulable arm 102 and over to the rear of rough terrain container handler 100 where the other end of hose 526 is connected to air compressor 530 located on and may be mounted to the frame of rough terrain container handler 100, as shown in FIG. 22. While the present invention depicts the air compressor mounted at the rear frame of rough terrain container handler 100, the air compressor may be located on other areas of rough terrain container handler 100. Air compressor may be of any commercially available type of air compressor, such as the VANAIR Model RC 40 or other comparable model.

Referring now to FIG. 20, air transfer system 420 includes both delivering block 512 and receiving block 360. Delivering block 512 is on top handler 408. Receiving block 360 is mounted on the frame at the top of container 200. Each of these blocks 512 and 360 contain a recessed area 514 on the sides facing each other. In other words, recessed area 514 is on the bottom surface of block 512 and on the top surface of block 360. Within recessed area 514 is a screw hole (not shown) which is beveled to eliminate any sharp edges. Recessed area 514 is circular in shape though other comparable shapes would suffice. In the center of recessed area 514 is an air passageway.

The dimensions of the blocks are about 3"×3"×3". However, other comparable dimensions may be utilized. The configuration of the block is a square but may also be in other configurations, e.g., cylindrical having the edges rounded. Though the present invention uses metal for the blocks, it is also contemplated that other comparable materials, such as stainless steel, galvanized steel or aluminum, may be also be used without departing from the present invention.

In use, when delivering and receiving blocks 512 and 360 are aligned together, the blocks do not always align exactly. There is approximately a ½ tolerance that the corners of top handler 408 and the corners of container 200 may vary. Recessed areas 514 in blocks 512 and 360 account for this variation in alignment and ensure that at even at the extreme tolerance of unalignment (i.e., ½"), blocks 512 and 360 would still be able to effectively transfer up to 100% of the air from delivering block 512 to receiving block 360 because recessed areas 514 of each block would overlap each other. Gasket 516 eliminates air leakage from occurring during the transfer.

Receiving block 360 is located on container 200. Top handler 408 aligns with container 200. Delivering block 512 on top handler 408 is pressed against receiving block 360 on container 200. This aligns recessed areas 514 of each block together. Then air may be transferred via the air passageway from rough terrain container handler 100 over to container 200. Gasket 516 is compressed preventing any leaks from occurring during the air transfer process. Springs 520 keep the blocks 512 and 360 compressed to each other during air transfer. The circular recessed areas 514 insure that even with up to one half inch (½") of play in the alignment of metal blocks 512 and 360, 100% of the air is transferred from delivering block 512 to receiving block on container 200.

Figure 23:
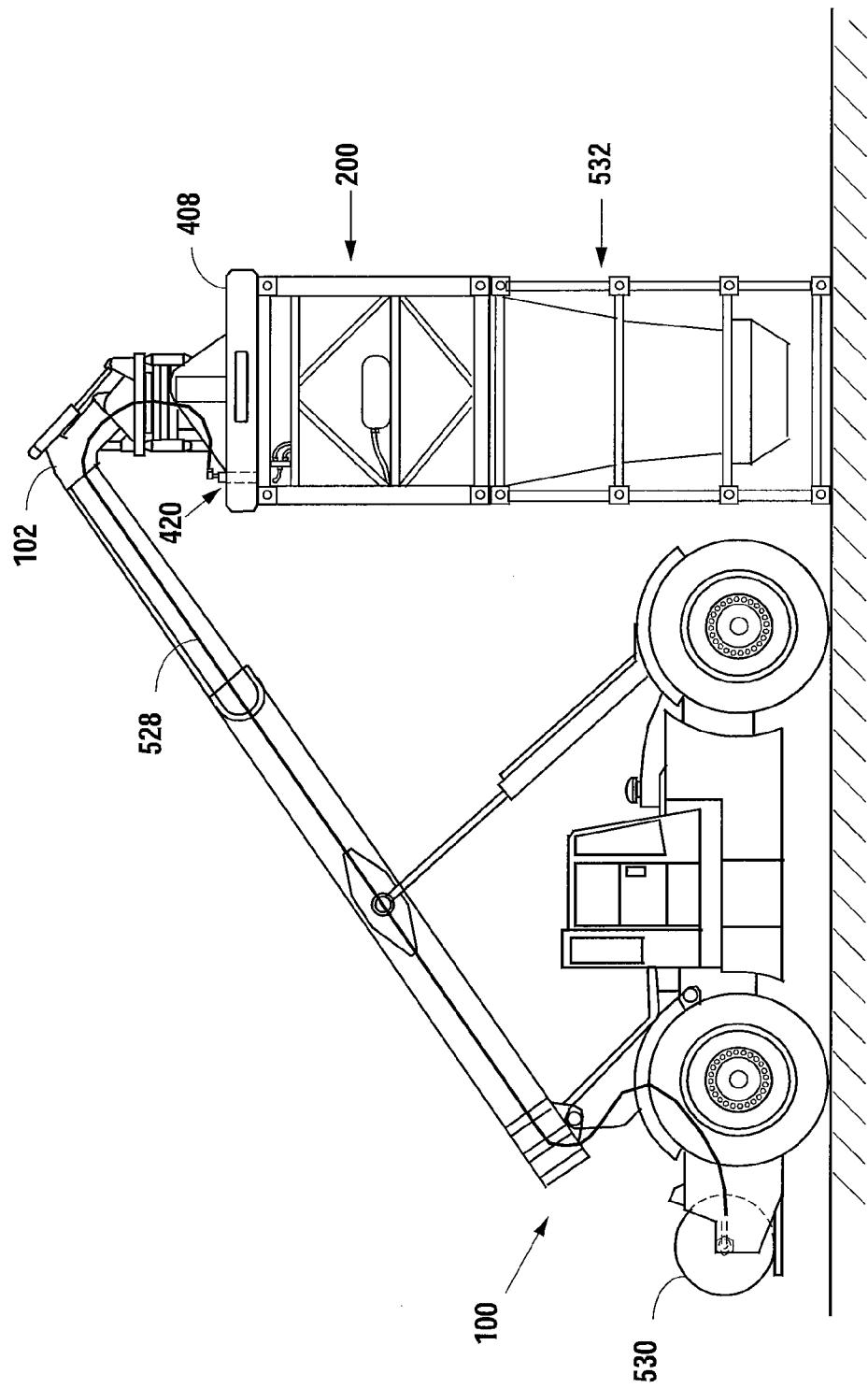
FIG. 23 is a side elevation view showing the rough terrain container handler loading the container onto a storage receptacle.

Now referring to FIGS. 22 and 23, once container 200 is filled with bulk material and engaged and lifted by rough terrain container handler 100, container 200 may be placed on a truck for delivery off site or set down in an area where container 200 may be stacked on each other for storage. In addition, container 200 may be placed on storage tank 532, as shown in FIG. 23. Container 200 may also be set down on a storage tank on top of a stand over a hopper/blender (not shown). The storage tank may have a holding capacity of about 70,000 lbs. of sand. The storage tank has gates that open on the bottom and there are angled panels to direct the flow of materials into the blender. Container 200 will then be placed on top of the storage container. A continuous feeding of sand into the container 200 may be maintained as the bulk material load of container 200 falls into the storage tank and then ultimately into the blender.

In an alternative embodiment, the intermodal container may also include a cover when delivering frac material (e.g., frac sand proppant, etc.). When using these frac materials, a cover is placed on top of the intermodal cargo container to keep out moisture and contaminants. The cover also prevents the sand cargo from becoming wet and getting packed at the bottom of the hopper and potentially jamming the unloading process. The jamming will generally not occur in the process of unloading the sand content from the intermodal container of the present invention. However, it would most likely occur in the container of others, e.g., blenders. The use of such a cover prevents or minimizes downtime due to jamming as just described.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

I claim:

1. A system for handling bulk materials comprising:
   a container;
   a rough terrain container handler releasably attached to said container;
   an air transfer system having a delivery component attached to said rough terrain container handler and a receiving component attached to said container;
   a plunger system mounted on said rough terrain container handler, wherein said plunger system comprises:
     a housing;
     a cylinder slidable within said housing, said cylinder having a clevis at a top end;
     a guide lip attached to the bottom of said housing, said guide lip extending down and outward at an obtuse angle of approximately 130° relative to a horizontal plane along said bottom of said housing;
     a mounting bracket mounted to said housing;
     a pin releasably connecting said housing to sid cylinder at a desired height within said housing;
     a plurality of fluid lines connecting said plunger system to said rough terrain container handler;
     a rod connected at one end to said cylinder; and
     a plunger connected to an opposite end of said rod.

2. The system for handling bulk materials, as recited in claim 1, further comprising a plurality of fasteners for fastening said mounting bracket to said rough terrain container.

3. The system for handling bulk materials, as recited in claim 2, wherein said pin is secured to said housing and said cylinder with a clip.

4. The system for handling bulk materials, as recited in claim 3, wherein said air transfer system further comprises:
   a housing;
   a column slidable connected within housing:
   a block having a recessed area and fluid pathway therein, said block connected to a bottom end of said column;
   a mounting bracket mounted to said housing;
   a pin releasably connecting said housing to said column at a desired height within said housing;
   a plurality of springs connected on one end to said block and connected at the other end to said column;
   a plurality of fasteners within said plurality of springs, said plurality of fasteners connected to said block on one end and connected to said column at the other end;
   a gasket attached to the bottom surface of said block, said gasket having an opening in alignment with said recessed area of said block;
   a connector having a first end and a second end, said first end connected to said block;
   a fluid line connected to said second end of said connector; and
   an air source connected to said fluid line.

5. The system for handling bulk materials, as recited in claim 4, wherein said gasket is comprised of a compressible material.

6. The system for handling bulk materials, as recited in claim 5, further comprising a plurality of fasteners for fastening said gasket to said block.

7. The system for handling bulk materials, as recited in claim 5, wherein said air source is an air compressor.

8. The system for handling bulk materials, as recited in claim 7, further comprising a storage receptacle.

9. A system for handling bulk material, said system comprising:
   a container;
   a rough terrain container handler vehicle;
   an air transfer system releasably mounted to said rough terrain container handler vehicle, said air transfer system having a first portion and a second portion and wherein said first portion of said air transfer system is attached to said rough terrain container handler vehicle and said second portion of said air transfer system is attached to said container, said air transfer system comprising:
     an air source;
     a housing;
     slidable column within said housing;
     a first block attached to one end of said slidable column and having a recessed portion in the center of said first block and an aperture in the center of said recessed portion, said aperture providing a fluid pathway;
     a plurality of biasing means for biasing said first block toward said second portion of said air transfer system, said plurality of biasing means connected to said slidable column;
     fastening means for fastening said first block to said slidable column;
     a fluid line having a first end and a second end, said first end of said fluid line connected to said air source;
     a connector connected to said first block on one side and to said second end of said fluid line; and a gasket attached to said first block;

a plunger system releasably mounted to said rough terrain container handler vehicle;

at least one air tank attached to said container and in fluid communication with said air transfer system; and a lever mounted on said container and in fluid communication with said at least one air tank.

10. The system for handling bulk materials, as recited in claim 9, further comprising a pin for securing said column at a desired height within said housing.

11. The system for handling bulk materials, as recited in claim 10, wherein said second portion of said air transfer system comprises:

a corresponding second block mounted on said container;

at least one air tank;

a fluid line connected at one end to said second block and connected at an opposite end to said at least one air tank.

12. The system for handling bulk materials, as recited in claim 11, wherein said biasing means is a coil spring.

13. The system for handling bulk materials, as recited in claim 12, wherein said fastening means is a bolt.

14. The system for handling bulk materials, as recited in claim 13, wherein said plunger system comprises:

a housing having a plurality of apertures along opposite sides of said housing;

a guide extending out from the bottom of said housing;

a cylinder slidable within said housing;

a pin for securing said cylinder at a desired height within said housing via said plurality of apertures;

at least one fluid line connecting said plunger system to a fluid source; and wherein said plunger system is attached to said rough terrain container handler vehicle.

15. The system for handling bulk materials, as recited in claim 14, wherein said container comprises:

a frame;

a hopper attached within the frame, the hopper defining a chute having a first opening and a second opening;

at least one door pivotally attached to the hopper proximal to the second opening;

at least one gate assembly attached to at least one door;

a connector apparatus panel mounted to the frame; and at least one actuating fluid or electrical line connected between the at least one gate and the connector apparatus panel.

* * * * *